United States Patent
Catt

(10) Patent No.: US 11,898,869 B2
(45) Date of Patent: Feb. 13, 2024

(54) MULTI-AGENT MAP GENERATION

(71) Applicant: Commonwealth Scientific and Industrial Research Organisation, Acton (AU)

(72) Inventor: Gavin Catt, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 0 days.

(21) Appl. No.: 17/778,648

(22) PCT Filed: Aug. 9, 2021

(86) PCT No.: PCT/AU2021/050871
§ 371 (c)(1),
(2) Date: May 20, 2022

(87) PCT Pub. No.: WO2022/040723
PCT Pub. Date: Mar. 3, 2022

(65) Prior Publication Data
US 2023/0175860 A1   Jun. 8, 2023

(30) Foreign Application Priority Data

Aug. 25, 2020  (AU) ................................ 2020903029

(51) Int. Cl.
*G01C 21/00* (2006.01)
*G01C 21/32* (2006.01)

(52) U.S. Cl.
CPC ......... *G01C 21/3841* (2020.08); *G01C 21/32* (2013.01); *G01C 21/3848* (2020.08); *G01C 21/3867* (2020.08)

(58) Field of Classification Search
CPC ................ G01C 21/3841; G01C 21/32; G01C 21/3848; G01C 21/3867
See application file for complete search history.

(56) References Cited

U.S. PATENT DOCUMENTS

| | | | |
|---|---|---|---|
| 2014/0316616 A1 | 10/2014 | Kugelmass | |
| 2015/0228077 A1* | 8/2015 | Menashe | G06T 7/60 |
| | | | 382/103 |

(Continued)

FOREIGN PATENT DOCUMENTS

| | | |
|---|---|---|
| CN | 109559277 A | 4/2019 |
| WO | WO-2020/035661 A1 | 2/2020 |

OTHER PUBLICATIONS

Philipp Egger, Paulo V. K. Borges, Gavin Catt, Andreas Pfrunder, Renaud Dube, PoseMap: Lifelong, Multi-Environment 3D LiDAR Localization, in IEEE/RSJ International Conference on Intelligent Robots and Systems (IROS), Madrid, Spain, Oct. 2018.

(Continued)

*Primary Examiner* — Rami Khatib
(74) *Attorney, Agent, or Firm* — Goodwin Procter LLP

(57) ABSTRACT

A system for generating a map of an environment, the system including a plurality of agents that acquire mapping data captured by a mapping system including a range sensor. The mapping data is indicative of a three dimensional representation of the environment and is used to generate frames representing parts of the environment. The agents receive other frame data from other agents, which is indicative of other frames representing parts of the environment generated using other mapping data captured by a mapping system of the other agents. Each agent then generates a graph representing a map of the environment by generating nodes using the frames and other frames, each node being indicative of a respective part of the environment, and calculating edges interconnecting the nodes, the edges being indicative of spatial offsets between the nodes.

21 Claims, 18 Drawing Sheets

(56) References Cited

U.S. PATENT DOCUMENTS

| | | | |
|---|---|---|---|
| 2018/0045519 A1* | 2/2018 | Ghadiok | G06V 20/582 |
| 2020/0011668 A1* | 1/2020 | Derhy | G06T 7/73 |
| 2020/0080849 A1 | 3/2020 | Ondruska et al. | |
| 2020/0225673 A1 | 7/2020 | Ebrahimi Afrouzi et al. | |
| 2022/0198935 A1* | 6/2022 | Adams | G01C 21/30 |

OTHER PUBLICATIONS

Michael Bosse and Paul Newman and John Leonard and Seth Teller, "SLAM in large-scale cyclic environments using the Atlas framework", International Journal of Robotics Research (2004).

P. Newman and Kin Ho, "SLAM-Loop Closing with Visually Salient Features," Proceedings of the 2005 IEEE International Conference on Robotics and Automation, 2005, pp. 635-642, doi: 10.1109/ROBOT.2005.1570189.

Lisien, B. et al., The hierarchical atlas, IEEE Transactions on Robotics, vol. 21, No. 3, published Jun. 2005, pp. 473-481 <URL:http://biorobotics.ri.cmu.edu/papers/paperUploads/The%20Hierarchical%20Atlas.pdf<https://protect-us.mimecast.com/s/1t_cCBBn1psr4A6O16PBS4?domain=biorobotics.ri.cmu.edu>>.

Mangelson, J. G. et al., Pairwise consistent measurement set maximization for robust multi-robot map merging, IEEE International Conference on Robotics and Automation (ICRA), published May 21, 2018, pp. 2916-2923 <URL: https://ieeexplore.ieee.org/stamp/stamp.jsp?tp=&arnumber=8460217_<https://protect-us.mimecast.com/s/WFf5CDk0wrfzVMvkfAOseE?domain=ieeexplore.ieee.org>>.

Pose Graph Optimization website: https://web.archive.org/web/20160305205128/http:/rvsn.csail.mit.edu/graphoptim/_<https://protect-us.mimecast.com/s/sbBUCADm8ocXWV6zHGRKLY?domain=web.archive.org/>.

M. Mazuran, G.D. Tipaldi, L. Spinello, W. Burgard, and C. Stachniss. A Statistical Measure for Map Consistency in SLAM. In Proc. of the IEEE Int. Conf. on Robotics & Automation (ICRA), 2014.

* cited by examiner

MULTI-AGENT MAP GENERATION

CROSS-REFERENCE TO RELATED APPLICATIONS

This application is a U.S. national stage application, filed under 35 U.S.C. § 371, of International Application No. PCT/AU2021/050871, entitled "Multi-Agent Map Generation" filed on Aug. 09, 2021, which claims priority to, and the benefit of Australian provisional patent application serial number 2020/903,029, entitled "Multi-Agent Map Generation" filed on Aug. 25, 2020, the disclosures of each of which are hereby incorporated by reference in their entirety for all purposes.

BACKGROUND OF THE INVENTION

The present invention relates to a system and method for generating a map of an environment, and in particular a system and method for generating a map of an environment using multiple agents within the environment.

DESCRIPTION OF THE PRIOR ART

The reference in this specification to any prior publication (or information derived from it), or to any matter which is known, is not, and should not be taken as an acknowledgement or admission or any form of suggestion that the prior publication (or information derived from it) or known matter forms part of the common general knowledge in the field of endeavour to which this specification relates.

It is known to use agents, such as autonomous vehicles equipped with three-dimensional (3D) mapping systems, to generate maps of environments. Such systems typically use a range sensor, such as a LiDAR range scanner, which measures reflected laser light to find the range of part of the environment, with this information in turn being used to create point clouds. Suitable analysis of the range data, for example using a simultaneous localisation and mapping (SLAM) algorithm, allows the agent to localise itself within the environment, allowing the agent to navigate within the environment whilst generating the map of the environment.

The generation of such maps are subject to a number of inaccuracies. For example, trajectories of the agent within the environment are often tracked using inertial sensors, which are subject to drift, whilst inaccuracies in the range sensing process and analysis of the resulting data can result in maps that are not fully accurate. A further issue is that the process of traversing and mapping the environment can be time consuming, which is particularly problematic in applications, such as a search and rescue scenarios. Furthermore, in some instances the environments can be difficult to traverse, meaning an agent is only capable of traversing parts of the environment due to its own inherent capabilities. This not only prevents some parts of the environment being mapped, but can also impact on the resulting accuracy of the map, for example preventing loop closure, which can assist in improving map accuracy.

Whilst attempts have been made to perform mapping using multiple agents, these have relied on offline batched approaches that generate a single global map. Whilst this can result in an accurate map, this does not scale well, is unable to run real-time after a period of time, and is not easily shared, primarily as a result of book-keeping requirements leading to a linear increase in computation requirements, which after factoring in the other requirements, becomes infeasible for the problem.

SUMMARY OF THE PRESENT INVENTION

In one broad form, an aspect of the present invention seeks to provide a system for generating a map of an environment, the system including a plurality of agents, each agent including one or more processing devices configured to: acquire mapping data captured by a mapping system including a range sensor, the mapping data being indicative of a three dimensional representation of the environment; generate frames representing parts of the environment using the mapping data; receive other frame data from one or more other agents, the other frame data being indicative of other frames representing parts of the environment generated using other mapping data captured by a mapping system of the one or more other agents; and, generate a graph representing a map of the environment by: generating nodes using the frames and other frames, each node being indicative of a respective part of the environment; and, calculating edges interconnecting the nodes, the edges being indicative of spatial offsets between the nodes.

In one embodiment each agent maintains a respective independent graph based on: the frames generated based using mapping data captured by the agent; and the other frames generated using other mapping data captured by the one or more other agents.

In one embodiment the one or more processing devices are configured to: generate an initial graph using the frames; and, update the graph using additional frames and other frames by at least one of: generating additional nodes or edges; and, refining edges within the graph.

In one embodiment the one or more processing devices are configured to determine the graph at least in part using a trajectory traversed by the agent.

In one embodiment the graph generated by each agent is based on locally accurate trajectories traversed by the agents and is globally consistent with graphs generated by other agents.

In one embodiment the one or more processing devices are configured to determine a trajectory using at least one of: one or more inertial position sensors; and, using signals from the range sensor.

In one embodiment the one or more processing devices are configured to calculate edges interconnecting the nodes at least in part using the trajectory.

In one embodiment the one or more processing devices are configured to generate the frames by segmenting the mapping data.

In one embodiment the one or more processing devices are configured to generate frames based on at least one of: a capture time of the mapping data; a capture duration of the mapping data; a distance traversed during capture of the mapping data; a rotation traversed during capture of the mapping data; and, a coverage of the mapping data.

In one embodiment the one or more processing devices are configured to: segment a trajectory traversed by the agent; and, generate the frames using trajectory segments.

In one embodiment the one or more processing devices are configured to: analyse the frames; and, generate nodes based on results of the analysis.

In one embodiment the one or more processing devices are configured to: generate a number of parent nodes, each parent node representing a different part of the environment; and, generate a number of child nodes, each child node being associated with a parent node and representing a part of the environment that is the same as or overlaps with the part of the environment represented by the associated parent node.

In one embodiment the child nodes are related to the parent node through a fixed geometrical transformation.

In one embodiment the one or more processing devices are configured to identify child and parent nodes based on at least one of: a degree of overlap between frames associated with the nodes; and, a degree of movement between capture of the frames associated with the nodes.

In one embodiment the one or more processing devices are configured to calculate edges extending between the parent nodes to generate the graph.

In one embodiment the one or more processing devices are configured to: generate edges between nodes; and, if an edge is connected to a child node, propagate the edge to the parent node associated with the child node.

In one embodiment the one or more processing devices are configured to propagate the edge using a geometrical transformation between the child and parent node.

In one embodiment the one or more processing devices are configured to: calculate edges between the nodes; and, use an iterative optimisation process to refine the edges.

In one embodiment the one or more processing devices are configured to calculate edges using at least one of: a localised drift approach; loop closure; and, place recognition.

In one embodiment the one or more processing devices are configured to calculate edges by using a trajectory traversed by the agent to calculate a spatial offset between nodes.

In one embodiment the one or more processing devices are configured to calculate edges by: using an alignment process to align frames of different nodes; and, calculate the edge using the alignment.

In one embodiment the one or more processing devices are configured to perform the alignment process using an iterative closest point algorithm.

In one embodiment the one or more processing devices are configured to: use a matching process to identify potential matching nodes; and, use potential matching nodes to perform at least one of: loop closure; and, place recognition.

In one embodiment the one or more processing devices are configured to perform the matching process by: comparing a node to one or more other nodes; and, generating a ranking based on results of the comparison, the ranking being indicative of a degree of similarity between the node and the one or more other nodes.

In one embodiment the one or more processing devices are configured to compare the node to one or more other nodes by: calculating a signature for the node, the signature being based on one or more features of the frame associated with the node; and, comparing the signature to other signatures of other nodes.

In one embodiment the one or more processing devices are configured to derive the signature for a node using a low dimensional representation of the frame associated with the node.

In one embodiment the one or more processing devices are configured to use the ranking to at least one of: determine if the node represents a different part of the environment and can be designated as a parent node or child node; generate a graph topology; generate one or more edges; perform loop closure; and, perform place recognition.

In one embodiment the one or more processing devices are configured to: generate one or more candidate graph topologies using results of the matching process; validate at least one candidate graph topology based on overlaps between nodes associated with the graph topology; and, calculate one or more edges in accordance with the validated graph topology.

In one embodiment the one or more processing devices are configured to: acquire frame data indicative of one or more new frames; generate a candidate node corresponding each new frame; calculate candidate edges using at least one of: a trajectory traversed by an agent; an alignment process; and, a matching process; update the graph by at least one of: adding one or more nodes based on the candidate nodes; and, adding or updating one or more edges based on the candidate edges.

In one embodiment the one or more processing devices are configured to: identify changes in the graph including at least one of: added nodes; added edges; and, updated edges; evaluate changes in the graph; and, selectively update the graph based on results of the evaluation.

In one embodiment the one or more processing devices are configured to: calculate a confidence value associated with at least some parts of the graph; and, selectively update the graph based on the confidence values.

In one embodiment if a node is a new node or is proximate a new edge, the one or more processing devices are configured to: assess confidence values associated with nearby nodes and edges; and, if the confidence value exceeds a threshold: perform alignment matching with nearby nodes and edges; and, generate new edges based on results of the alignment matching; and, if the confidence value falls below a threshold perform matching to identify potential matching nodes.

In one embodiment the one or more processing devices are configured to: calculate estimated errors associated with edges in the graph; and, at least one of: generate confidence values based on the estimated errors; and, optimise the graph at least in part using the estimated errors.

In one embodiment the one or more processing devices are configured to perform optimisation by: identifying edges with a high estimated error; and, validating the identified edges using graph prediction.

In one embodiment the one or more processing devices are configured to iteratively solve the graph using an optimisation approach until the graph converges to a result.

In one embodiment the one or more processing devices are configured to: solve the graph based on edge constraints optimising for least squares error on the edges; update errors associated with the edges; and, repeat the solving and updating steps until the graph converges.

In one embodiment the one or more processing devices are configured to: obtain a frame manifest from one or more other agents, the frame manifest being indicative of frames available to the one or more other agents; and, request frames from the one or more other agents in accordance with the frame manifest.

In one embodiment the one or more processing devices are configured to: receive a manifest request from one or more other agents; and, provide a frame manifest in response to the manifest request.

In one embodiment the one or more processing devices are configured to: receive a frame request from one or more other agents, the frame request being indicative of one or more required frames; and, provide frame data in response to the frame request.

In one embodiment the frame data for a frame is at least one of: a lower dimensional representation of the frame; and, a surfel representation of the frame.

In one embodiment the agents include autonomous vehicles.

In one broad form, an aspect of the present invention seeks to provide a method for generating a map of an environment, the method including, in a plurality of agents, each agent including one or more processing devices: acquiring mapping data captured by a mapping system including a range sensor, the mapping data being indicative of a three dimensional representation of the environment; generating frames representing parts of the environment using the mapping data; receiving other frame data from one or more other agents, the other frame data being indicative of other frames representing parts of the environment generated using other mapping data captured by a mapping system of the one or more other agents; and, generating a graph representing a map of the environment by: generating nodes using the frames and other frames, each node being indicative of a respective part of the environment; and, calculating edges interconnecting the nodes, the edges being indicative of spatial offsets between the nodes.

In one broad form, an aspect of the present invention seeks to provide a computer program product for generating a map of an environment, the computer program product including computer executable code, which when run on one or more suitably programmed processing devices provided in a plurality of agents, causes the one or more processing devices to: acquire mapping data captured by a mapping system including a range sensor, the mapping data being indicative of a three dimensional representation of the environment; generate frames representing parts of the environment using the mapping data; receive other frame data from one or more other agents, the other frame data being indicative of other frames representing parts of the environment generated using other mapping data captured by a mapping system of the one or more other agents; and, generate a graph representing a map of the environment by: generating nodes using the frames and other frames, each node being indicative of a respective part of the environment; and, calculating edges interconnecting the nodes, the edges being indicative of spatial offsets between the nodes.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which.

DETAILED DESCRIPTION OF THE PREFERRED EMBODIMENTS

Figure 1:
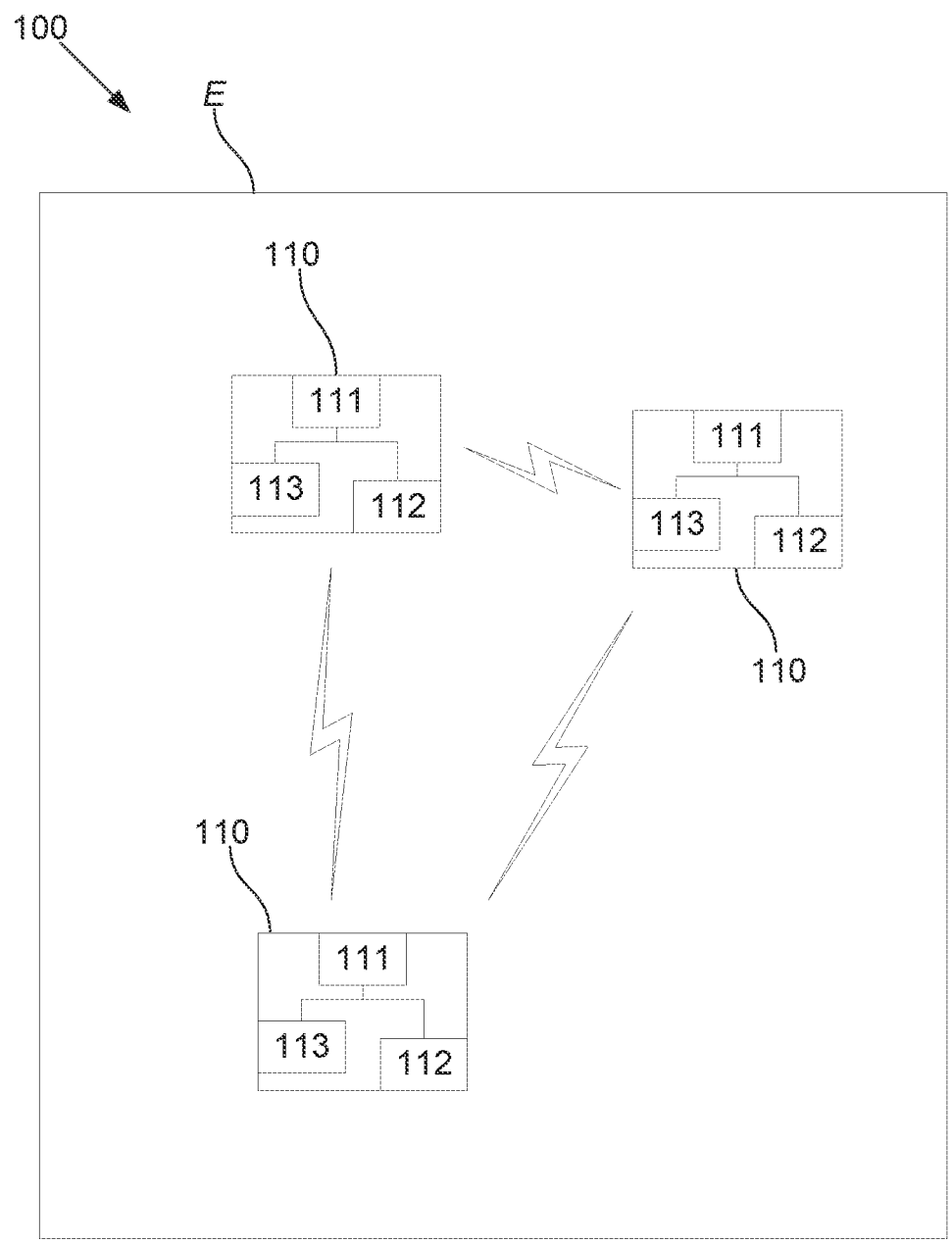
FIG. 1 is a schematic diagram of an example of a system for mapping an environment.

An example of a system for mapping an environment will now be described with reference to FIG. 1.

In this example, the system 100 includes a plurality of agents 110 within an environment E. The nature and number of the agents 110 will vary depending on a range of factors, such as the nature of the environment E and the particular application. For example, the agents 110 could include autonomous vehicles, robots, unmanned aerial vehicles (UAVs), or the like, but could also include mapping systems carried by an individual (person) or vehicle. Whilst multiple agents of the same type could be used, in other examples a combination of different types of agents could be used, allowing different parts of the environment to be traversed using different forms of locomotion, for example using a combination of aerial and ground-based drones. The environment E could be a natural environment, and could be open, such as an outdoor area, or could be confined, such as in a cave system or similar. The environment E could additionally, and/or alternatively, be a constructed environment, such as a building, underground mine, or the like, or a combination of the natural and constructed environments.

Irrespective of the nature of the agents 110, each agent 110 will typically include a mapping system 112, including a range sensor, such as a LiDAR sensor, stereoscopic vision system, or the like. Additionally, each agent will include one or more electronic processing devices 111, typically forming part of one or more processing systems, which are configured to receive signals from the range sensor of the mapping system 112 and use these to generate a map of the environment and/or control navigation of the agent through the environment. In one specific example, this involves having the agent implement a SLAM type algorithm to perform simultaneous localisation and mapping.

Whilst each agent can use multiple processing devices, with processing performed by one or more of the devices, for the purpose of ease of illustration, the following examples will refer to a single processing device. Nevertheless, it will be appreciated that reference to a singular processing device should be understood to encompass multiple processing devices and vice versa, with processing being distributed between the devices as appropriate. Furthermore, the processing device could be of any suitable form and could include a microprocessor, microchip processor, logic gate configuration, firmware optionally associated with implementing logic such as an FPGA (Field Programmable Gate Array), or any other electronic device, system or arrangement.

The agents are also configured to communicate with each other, to exchange information, and this could be achieved using any suitable communication system, such as wireless point-to-point communications, communications via a communications network, or the like. In one example, this could be achieved using a wireless mesh network, established using each of the agents as a respective node in the network, although this is not essential and other approaches could be used.

Figure 2:
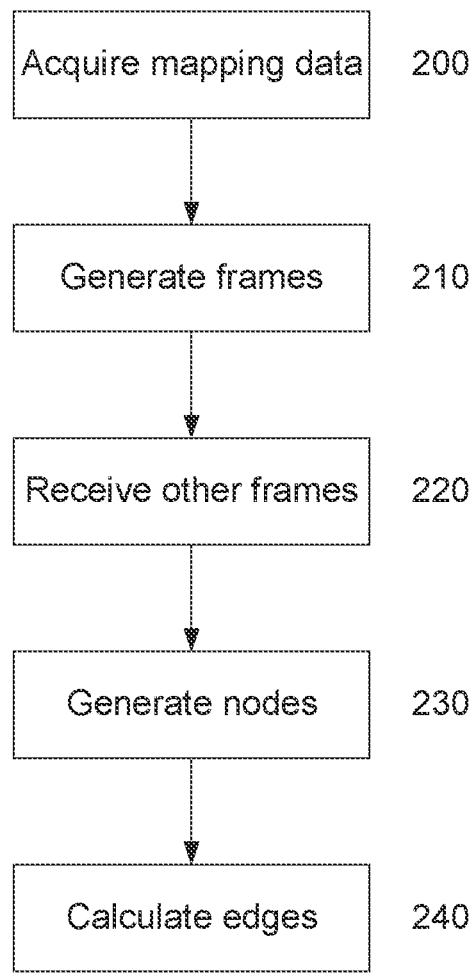
FIG. 2 is a flow chart of an example of a method for mapping an environment.

An example of a mapping process will now be described in more detail with reference to FIG. 2.

In this example, at step 200 the processing device 111 acquires mapping data captured by the mapping system 112. The mapping data is indicative of a three dimensional representation of the environment, and may be in the form of a point cloud or similar. The mapping data might be received directly from the mapping system 112, or retrieved from memory, or the like. The mapping data may undergo processing as needed, for example to process range information collected by the range sensor, and covert the range information into a point cloud or other similar format.

At step 210, the processing device 111 generate frames representing parts of the environment using the mapping data. The individual frames typically represent a sub-map formed from a part of the mapping data, and may represent mapping data collected during a defined time interval, over a defined amount of agent travel, or the like.

At step 220, the processing device 111 receives other frame data from one or more other agents 110. The other frame data is indicative of other frames representing respective parts of the environment E, which are generated using other mapping data captured by a mapping system 112 of the one or more other agents 110. This, it will be appreciated that each agent 110 typically generates frames representing one or more parts of the environment E that the agent is traversing, and then transmits these frames to other agents, allowing each of the agents to establish a map of the entire environment. Frames could be periodically transmitted, but more typically are sent in response to a request, to thereby minimise transmission bandwidth requirements, as will be described in more detail below.

Once the agent has a number of frames, the processing device 111 uses the frames to generate a graph representing a map of the environment. In order to achieve this, at step 230 the processing device 111 generates nodes using the frames and other frames, with each node being indicative of a respective part of the environment. Following this, or concurrently, the processing device 111 also calculates edges interconnecting the nodes at step 240, with the edges being indicative of spatial offsets between the nodes.

The process of generating the map typically involves identifying frames corresponding to unique parts of the environment, for example by using matching techniques or tracking movement of agents within the environment. Edges are then generated by identifying spatial relationships between these nodes using a variety of different techniques, such as performing alignment of frames and/or tracking movement of the agents.

Accordingly, the above-described process allows each agent to generate a map of the environment based on frames locally acquired by the agent, and other frames remotely acquired by other agents. This allows each agent to generate a respective map, including parts of the environment the agent has traversed, with other parts of the environment being completed based on frames received from other agents. It will be appreciated that this process can continue as the agents move within the environment, so that each agent progressively establishes their own map of the environment, with this map ultimately covering the entire environment, even though each agent may have only traversed part of the environment. Accordingly, the above approach allows each agent to map the entire environment without requiring each agent to traverse the entire environment.

Additionally, the above approach can help improve mapping accuracy. In this regard, as additional frames become available, these can be incorporated into the graph as new nodes, with associated new edges. Optimisation approaches can then use this additional information, so that the resulting map becomes progressively more accurate as more frames are added. In one example, this can be performed using an iterative optimisation approach configured to minimise errors within the calculated edges, as will be described in more detail below.

As each map is constructed independently by each agent, this means that each map might vary compared to the maps generated by other agents. In particular, the map generated by any one agent will be based on locally accurate trajectories traversed by that agent, whilst being globally consistent with graphs generated by other agents. This helps ensure that the maps can be used for accurate navigation by the agent within its immediate local environment, whilst allowing the agent to understand its position more broadly within the environment as a whole. As the agent moves to a part of the environment it has not previously traversed, the global map can be used to establishing a route, with the agent's own internal map being optimised as the agent moves through the environment, thereby increasing the accuracy of the map based on that agent's local trajectory.

It will be appreciated from the above that this allows maps of the environment to be established more rapidly, relying on data from multiple agents, and allows the maps to cover disparate terrain, which could not for example be traversed by a single type of agent. This is particularly important in applications such as search and rescue scenarios, where it might be necessary to rapidly search a large previously unmapped region that includes a range of different terrain and/or obstacles.

Additionally, by virtue of the agent's creating their own map, each agent can optimise the process of constructing the map, taking into account its own trajectory within the environment, and relationships to other frames to minimise the amount of analysis required to construct the maps, in turn allowing this to be implemented real-time in a scalable manner This allows for mapping and navigation in a real time manner within large-scale environments, which cannot be achieved using existing techniques.

A number of further features will now be described.

As previously mentioned, each agent maintains a respective independent graph based on the frames generated using mapping data captured by the agent, as well as other frames generated using other mapping data captured by the one or more other agents.

In one example, the processing device is configured to generate an initial graph using the frames and then progressively update the graph using additional frames and the other frames by generating additional nodes and/or adding or refining edges within the graph. Thus, as further frames are acquired by the agent, or other agents, these can be incorporated into the map, adding new nodes and associated edges corresponding to new parts of the environment and refining existing edges as additional data allows for improved optimisation of the graph.

In one example, the processing device is configured to determine the graph at least in part using a trajectory traversed by the agent, which can help ensure the graph generated by each agent is be based on locally accurate trajectories. In this regard, the processing device can be configured to determine the trajectory using one or more inertial position sensors, typically provided onboard the agent to assist with navigation and/or could involve using signals from the range sensor, for example tracking movement through the environment using a SLAM algorithm or similar. Knowledge of the trajectory traversed by the agent can then be used to calculate edges interconnecting the nodes in the graph. For example, for two nodes based on frames captured by the agent, the processing device can use the trajectory followed by the agent between capturing of the frames to estimate the spatial offsets between the frames, and hence generate an edge.

Additionally and/or alternatively, edges can be generated by examining alignment between different frames, for example calculating a geometrical transformation between overlaps in the frames of different nodes. In one example, these processes are performed in conjunction, so that the trajectory is used to estimate a spatial offset and generate a candidate edge between two nodes, with this being refined using alignment between the two nodes.

In one example, the processing device is configured to generate the frames by segmenting the mapping data. The process of segmenting the mapping data could be performed in any one of a number of ways, depending on factors, such as the nature of the agent and the preferred implementation. For example, the segmentation could be performed based on a capture time or capture duration of the mapping data, for example, segmenting the mapping data based on five second intervals, or the like. Additionally and/or alternatively, the segmentation could be performed based on a distance or rotation traversed during capture of the mapping data, for example generating a new frame for every 5-10 m traversed or following a rotation of more than 30°, or the like. The segmentation could also be performed based on a coverage of the mapping data, or the like. In one particular example, the processing device could be configured to segment a trajectory traversed by the agent and then generate the frames using trajectory segments. In any event, it will be appreciated that the particular approach used might vary depending on the nature of the environment and/or the nature of the agent, so that a faster moving agent might perform segmentation more frequently.

Once frames have been generated, the processing device can be configured to analyse the frames and generate nodes based on results of the analysis. The nodes could be of any appropriate form, and are typically used to represent the frames, without requiring all of the data associated with each frame to be stored as part of the node, for example by having the nodes include a pointer to a frame stored elsewhere in memory.

A respective node is typically generated for each frame. However, as there is significant overlap, and hence redundancy between frames, not all frames are required in order to generate an accurate map, and hence the processing device is configured to only process some frames as part of the map generation process.

In one example, this could be achieved by only generating nodes for frames that differ sufficiently to other frames, and hence will contribute in a meaningful manner to the generation of the map. More typically nodes are generated for all frames, but only some of the nodes are used in map optimisation. Whilst this can be achieved in any suitable manner, in one example, the processing device is configured to analyse the nodes and use results of the analysis to generate parent and child nodes. The parent nodes are used to represent different parts of the environment, whilst the child nodes are associated with a parent node and represent a part of the environment that is the same as or significantly overlaps with the part of the environment represented by the associated parent node. Thus, for example, when mapping a building, a parent node might be generated for each different area, such as different rooms, whilst child nodes are generated which correspond to different views captured within the room. Differentiating between parent and child nodes in this manner allows optimisation to be performed based on the parent nodes only, for example by calculating edges extending between the parent nodes to generate the graph, which can significantly reduce the computational complexity of constructing and optimising the map. Nevertheless, information associated with child nodes can be retained and utilised if needed, for example to assist with resolving ambiguities within the map.

The processing device can be configured to differentiate between child and parent nodes using a number of different approaches depending on the preferred implementation. For example, this could be based on a degree of similarity or overlap between frames associated with the nodes, or could be based on a degree of movement between capture of the frames associated with the nodes.

In general, the child nodes are related to the parent node through a fixed geometrical transformation, for example based on the different viewpoint when the parent and child and parent nodes are captured. In this instance, when constructing the map, the processing device can be configured to generate edges between nodes and if an edge is connected to a child node, propagate the edge to the parent node associated with the child node. Thus, for example, if a trajectory of the agent between capture of a child node and another parent node is known, this can be used to establish an edge between the child and the other parent node. Once this edge has been created, the edge can be propagated to the parent node of the child node, using the geometrical transformation between the child and parent node, so that an edge is created between the parent node and the other parent node.

When creating the map, the processing device is typically configured to calculate edges between the nodes and then use an iterative optimisation process to refine the edges. In this regard, when edges are initially constructed, these are subject to a range of inaccuracies. For example, when edges are generated based on inertial sensing of a trajectory, this can be inaccurate due to sensor drift or inaccuracies, or the like. However, by examining multiple edges within the graph, and looking at other aspects of the graph, such as alignments between different nodes, or the overall graph topology, this can be used to recalculate the edges, reducing errors in the edges, and hence increasing the accuracy of the resulting graph, as will be described in more detail below.

The processing device can be configured to calculate edges using a variety of techniques, such as a localised drift approach, loop closure or place recognition. In this regard, the localised drift approach will typically examine trajectories traversed by the agent and/or alignment between nodes, whilst the loop closure and place recognition typically use matching based on the similarity of nodes within the map, using an alignment process to generate edges. However, it will be noted that loop closure can also be detected in the same way as the localised drift approach, albeit with a larger radius to search against.

Thus, when performing the localised drift approach, the processing device can be configured to calculate edges by using a trajectory traversed by the agent to calculate a spatial offset between nodes. Following this, an alignment process can be used to align frames of different nodes and then calculate the edge using the alignment. Thus, the trajectory is used as a first pass to identify a potential spatial offset, with this being refined based on an alignment of frames associated with the different nodes, for example using an iterative closest point algorithm, or other suitable approach. Using the trajectory in this manner can constrain the alignment process, allowing this to be performed in a less computationally expensive manner, although it will be appreciated that this isn't essential and alternatively alignment could be performed solely using the trajectory, or without regard to the trajectory, for example if a trajectory isn't available or is deemed unreliable. The above processes could be performed using the parent nodes, or could use one or more child nodes, with the resulting edge being propagated to parent nodes as required.

Alternatively, in the event that a trajectory isn't available and/or alignment can't be performed, the processing device can use a matching process to identify potential matching nodes and then use potential matching nodes to perform loop closure and/or place recognition. For example, if two nodes within the graph match, then this could be indicative of a loop existing within the graph.

The processing device is typically configured to perform the matching process by comparing a node to one or more other nodes. In general, this comparison process is performed using signatures derived from the frames associated with the nodes, typically using a low dimensional representation of the frames, such as a surfel representation of the frame. In this example, the processing device typically calculates a signature for the node based on one or more features of the frame and then compares the signature to other signatures of other nodes. The signatures can be in the form of a vector based on a defined feature set, allowing the comparison to be performed using a nearest neighbour analysis in vector space, although it will be appreciated other approaches could be used. In this regard, when a node is initially created, the signature can be generated and stored, so that signatures are stored for each existing node within the graph, allowing this process to be performed rapidly as new nodes are added.

Results of the comparison process can be used to generate a ranking. The ranking is indicative of a degree of similarity between the node and the one or more other nodes, and hence can be used to indicate the likelihood of compared nodes being the same or overlapping nodes. This allows the ranking to be used to for example to identify potential matching nodes, to determine if a node represents a different part of the environment and can be designated as a parent node or child node, to generate a graph topology, to generate one or more edges, to perform loop closure or place recognition, or the like.

In one example, the processing device is configured to generate one or more candidate graph topologies using results of the matching process. For example, this can be used to generate a number of different candidate edges based on different potential node spatial arrangements. Following this, the processing device validates at least one candidate graph topology based on overlaps between nodes associated with the graph topology and then calculates one or more edges in accordance with the validated graph topology. Thus, in effect, the processing device creates multiple hypotheses of potential graph topologies, validating one of the hypotheses when sufficient nodes have been generated and analysed that fit the hypothesis.

Whilst the above-described processes can be performed when all nodes have been identified, more typically the graph is created progressively as additional frames are captured and/or received from other agents.

In this instance, the processing device is configured to acquire frame data indicative of one or more new frames and generate a candidate node corresponding each new frame. The processing devices then attempts to calculate candidate edges using a suitable approach, such as using a trajectory traversed by the agent that captured the frame, an alignment process and/or matching process, depending on the data available. Thus, if a trajectory to an existing node in the graph is not available, and/or alignment cannot be performed, a matching process can be used to attempt to identify where the node should be incorporated into the graph. If a frame cannot be matched or otherwise added, which might occur for example, if a frame is a first frame received from another agent in a different part of the environment, this might need to be retained for further analysis in due course. Otherwise, the processing device can update the graph by adding the one or more nodes based on the candidate nodes and/or adding or updating one or more edges based on the candidate edges.

Once a node and/or edges have been added, the processing device can identify changes in the graph, such as added nodes, added edges or updated edges, and then evaluate these changes in the graph. This can be used to assess likely errors in the changes, allowing the processing device to selectively update the graph based on results of the evaluation. Thus, as nodes and edges are added or amended, the changes are evaluated to see if the changes are accurate, and if not parts of the graph can be modified using an optimisation approach until a desired level of accuracy is achieved. In one example, this can be performed by calculating a confidence value associated with at least some parts of the graph, typically based on an estimated error associated with one or more edges, and then selectively update the graph based on the confidence values.

In one example, if a node is a new node or is proximate a new edge, the processing device assesses confidence values associated with nearby nodes and edges. If the confidence values exceed a threshold, the processing device performs alignment matching with nearby nodes and edges and generates new edges based on results of the alignment matching. Thus, alignment matching, which is typically computationally expensive, may only be performed once there is a high degree of certainty that the node is accurately positioned in the graph, allowing the edges to be calculated with a higher degree of accuracy. Otherwise, if the confidence value falls below a threshold, the processing device could perform matching to identify potential other matching nodes, which could be used for place recognition and/or loop closure.

In one example, the processing device is configured to calculate estimated errors associated with edges in the graph and then either generate confidence values based on the estimated errors and/or optimise the graph at least in part using the estimated errors. Specifically, the processing device can be configured to perform optimisation by identifying edges with a high estimated error and then validating the identified edges using graph prediction.

Optimisation can be achieved by iteratively solving the graph using an optimisation approach until the graph converges to a result, and in particular by solving the graph based on edge constraints optimising for least squares error on the edges, updating errors associated with the edges and repeating the solving and updating steps until the graph converges.

As mentioned above, each agent is able to generate the graph using frames from other agents. In order to achieve this, agents must be able to exchange information regarding captured frames as needed. Whilst agents could broadcast captured frames, agents may only be in communication range at limited times and this could therefore lead to frames being missed, as well as requiring large amounts of bandwidth.

Accordingly, more typically, processing devices of the different agents are configured to obtain a frame manifest from one or more other agents, the frame manifest being indicative of frames available to the one or more other agents and then request frames from the one or more other agents in accordance with the frame manifest. To achieve this, each processing device is configured to receive a manifest request from one or more other agents and then provide a frame manifest in response to the manifest request. The frame manifest will include an indication of all frames the agent is in possession of, including frames the agent has captured, but also frames the agent has received from other agents. This allows each agent to use the frame manifest to identify any frames that have been generated, and which they have not yet received, allowing the agent to request these as needed.

In this regard, the processing device of each agent is configured to receive a frame request from one or more other agents, the frame request being indicative of one or more required frames and provide frame data in response to the frame request. Thus, the frame request could be a request for frames captured by that agent and/or frames captured by other agents that the agent is in possession of. This allows an agent to receive frames from agents it has not been in direct communication with via one or more intervening agents, ensuring each agent is able to establish a globally complete list of frames.

Figure 3:
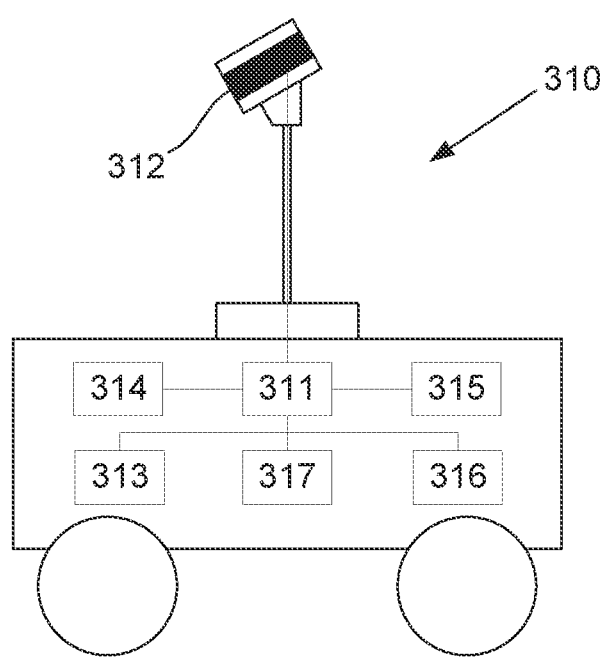
FIG. 3 is a schematic diagram of a further example of an agent.

As previously mentioned, in one example, the agents include autonomous vehicles and an example agent is shown in more detail in FIG. 3.

In this example, the agent 310 includes at least one electronic processing device 311 located on-board a mobile platform, such as ground vehicle, which is coupled to a mapping system 312 configured to perform scans of the environment surrounding the vehicle in order to build up a 3D map (i.e. point cloud) of the environment. In one example, the mapping system includes a 3D LiDAR sensor such as a VLP-16 3D LiDAR produced by Velodyne.

The processing device 311 is also coupled to an inertial sensing device 313, such as an IMU (inertial measurement unit), a control system 314 to allow movement of the agent to be controlled, and one or more other sensors 315. This could include proximity sensors for additional safety control, or an imaging device, or similar, to allow images of the environment to be captured, for example, for the purpose of colourising point cloud representations of the environment.

The processing device 311 can also be connected to an external interface 316, such a wireless interface, to allow wireless communications with other agents, for example via one or more communications networks, such as a mobile communications network, 4G or 5G network, WiFi network, or via direct point-to-point connections, such as Bluetooth, or the like.

The electronic processing device 311 is also coupled to a memory 317, which stores applications software executable by the processing device 311 to allow required processes to be performed. The applications software may include one or more software modules, and may be executed in a suitable execution environment, such as an operating system environment, or the like. The memory 317 may also be configured to allow mapping data and frame data to be stored as required, as well as to store any generated map. It will be appreciated that the memory could include volatile memory, non-volatile memory, or a combination thereof, as needed.

It will be appreciated that the above described configuration assumed for the purpose of the following examples is not essential, and numerous other configurations may be used. For example, although the agent is shown as a wheeled vehicle in this instance, it will be appreciated that this is not essential, and a wide variety of agents could be used, including UAVs, or the like.

Figure 4:
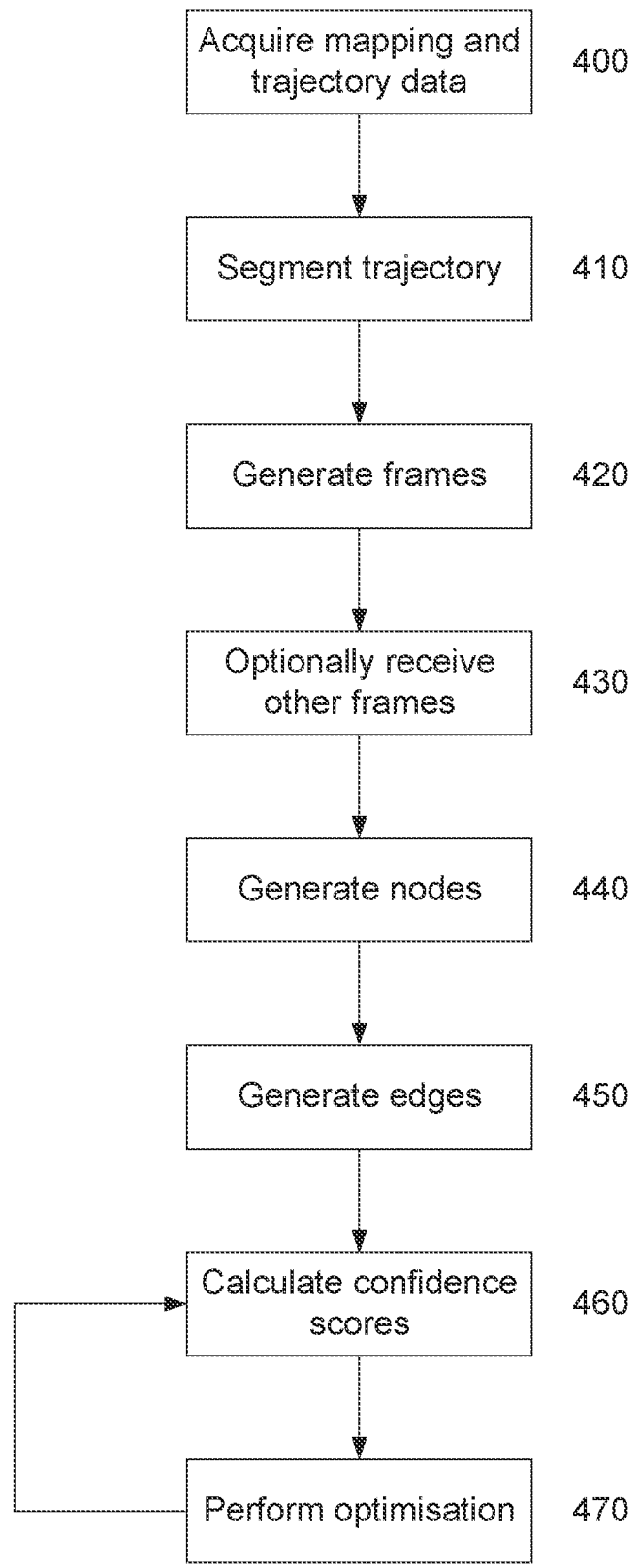
FIG. 4 is a flow chart of a further example of a method for mapping an environment.

An example process for generating a graph representing a map of an environment will now be described with reference to FIG. 4.

In this example, at step 400 the agent 310 acquires mapping and trajectory data using the on-board mapping system 312 and inertial sensors 313. At step 410, the processing device 311 segments the trajectory based on the time or distance traversed, using this to generate a number of frames at step 420, with each frame representing a fixed observation of a respective part of the environment and being based on the mapping data captured for a respective segment of the trajectory.

At step 430, the processing device optionally receives one or more other frames from one or more other agents 310, with the frames and other frames being stored as frame data in the memory 317.

At step 440, the processing device 311 generates nodes corresponding to each of the frames, typically identifying nodes as parent or child nodes, depending on the degree of uniqueness of the nodes. The processing device 311 then generates edges interconnecting the nodes, and in particular the parent nodes at step 450, typically using trajectory data to identify initial edges where possible, with matching being used to generate edges where trajectory information is not available. Alignment processes can also be used to establish alignment between nodes, which in turn can be used to generate edges.

At step 460, the processing device 311 calculates confidence scores associated with each edge, with the confidence score being based on estimated errors for each edge. In this regard, errors compound as the graph is constructed, so that errors further away from a trajectory origin or root node, are greater than those nearer the root node. Once confidence levels are calculated, these can be used to perform optimisation, in particular allowing edges to be recalculated to minimise an overall error, and thereby increase confidence levels. This process is typically repeated until the graph converges and no further improvements are identified.

Following this, it will be appreciated that the steps can be repeated as needed so that as additional mapping data and/or other frames become available, a global map can be constructed progressively.

An example of a process for generating and optimising a graph in this manner will now be described with reference to FIGS. 5A to 5E. This example is described with reference to a simplified 2D environment, but it will be appreciated that similar approaches can be used with point cloud 3D environment maps.

Figure 5A:
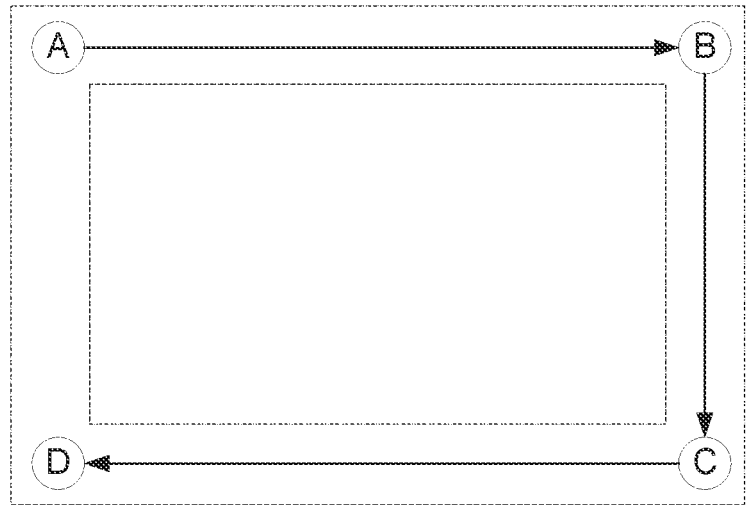
FIGS. 5A to 5E are schematic diagrams illustrating an example of optimisation of an example graph.
Figure 5B:
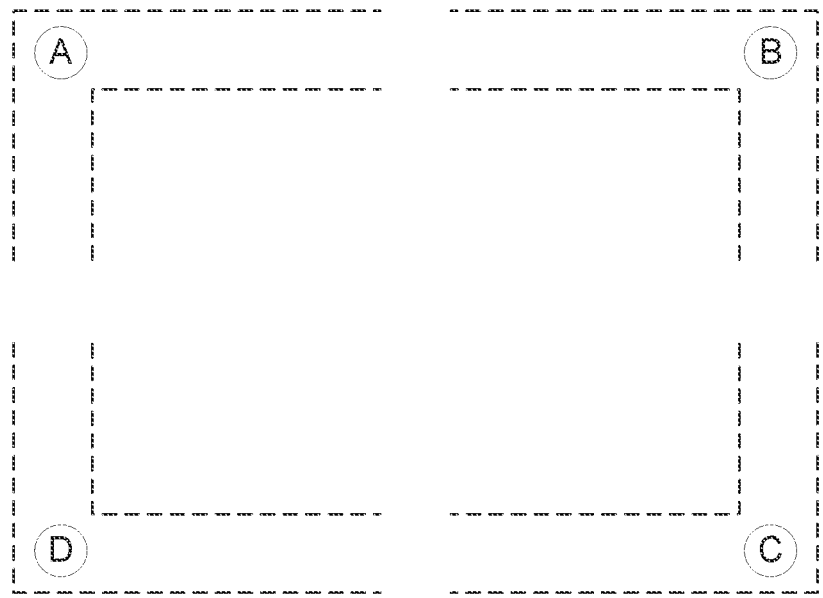

For the purpose of this example, it is assumed that an agent follows a trajectory between nodes A, B, C, D, for the notional graph shown in FIG. 5A, which involves having the agent capture the four frames corresponding to each of the nodes A, B, C, D shown in FIG. 5B. The frames represent a fixed point in the world as seen by the agent and are immutable, each possessing a unique identifier used for sharing purposes.

As the agent traverses the environment, it measures a trajectory, which is used to produce an odometry-estimated edge between the frames that form the initial map. Thus an edge from node A to node B can be constructed and this will be referred to by the nomenclature edge AB. With only these odometry edges, the globally optimised poses would largely be the same as a simple concatenation of the edges. It should be noted that the more edges that are crossed the larger the global error as the errors accumulate, but the edges themselves will be locally consistent for a single edge, so for example, the set of nodes A, B, C, with B as the origin will be locally consistent.

Figure 5C:
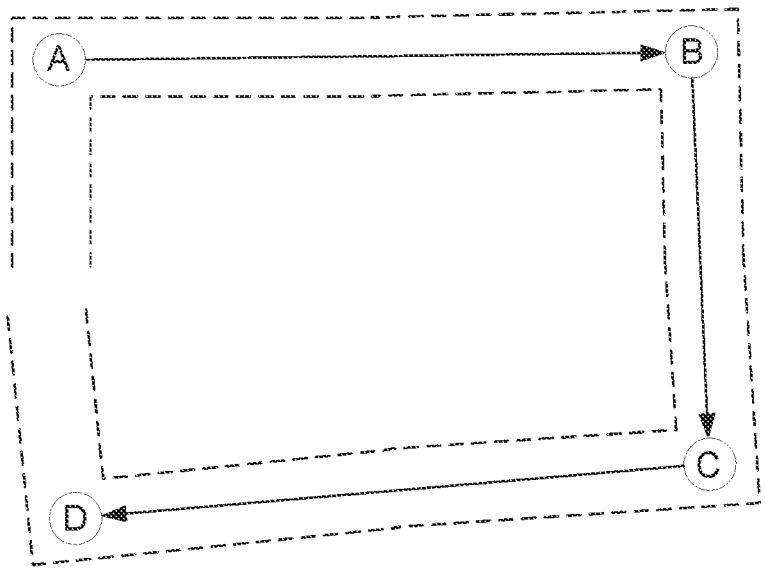

If we take an example of obtaining the current pose of D using the edges AB, BC, CD from a origin node A, then the graph might appear as shown in FIG. 5C. Here it can be seen that further away from the origin node A, the larger the error.

Figure 5D:
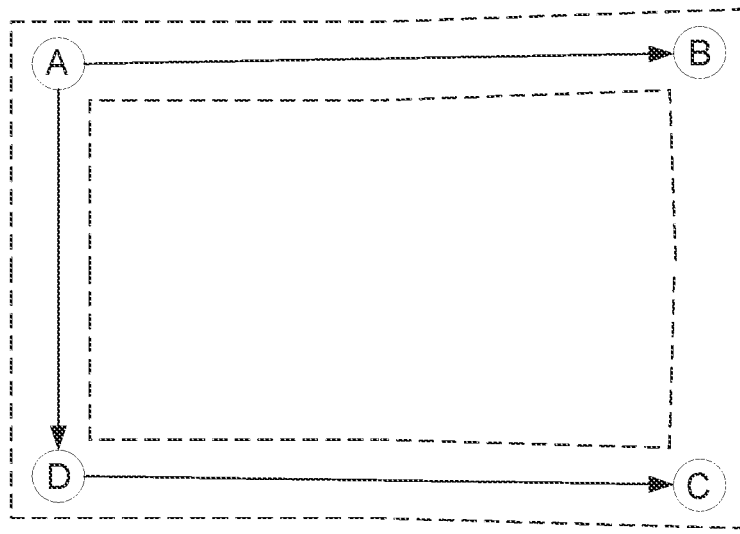
Figure 5E:
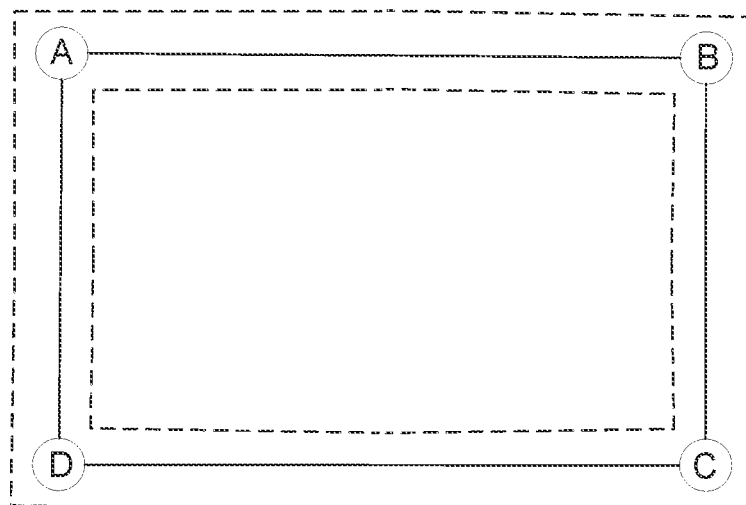

If it is assumed that an edge exists between nodes A and D, for example as a result of matching being performed to allow loop closure, this might allow for the errors to be reduced. Specifically, at this point, edge AD is a form of direct link from node A to node D established by way of loop closure. If the route to node C from node A is now considered, the graph would appear as shown in FIG. 5D. In this example, the graph is generated using the edge AD and DC, as opposed to the edge BC as the matched edge AD generated through loop closure has a higher degree of confidence than the edge BC.

Additionally, the new edge AD can be used for optimisation. For example, with no additional information other than traversed edges AB, BC, CD, there is little difference between traversing these edges and using globally optimised poses as there was no additional information to constrain the global solution. However, with the new edge AD incorporated into the graph, this means the error from node A to node B to node C to node D can now be distributed using an optimisation approach such as least squares optimization, resulting in a graph similar to that shown in FIG. 5E.

This approach means that we can utilise a combination of trajectory based edges, and edges identified through matching, in order to perform graph optimization in realtime to help provide global accuracy.

Figure 6:
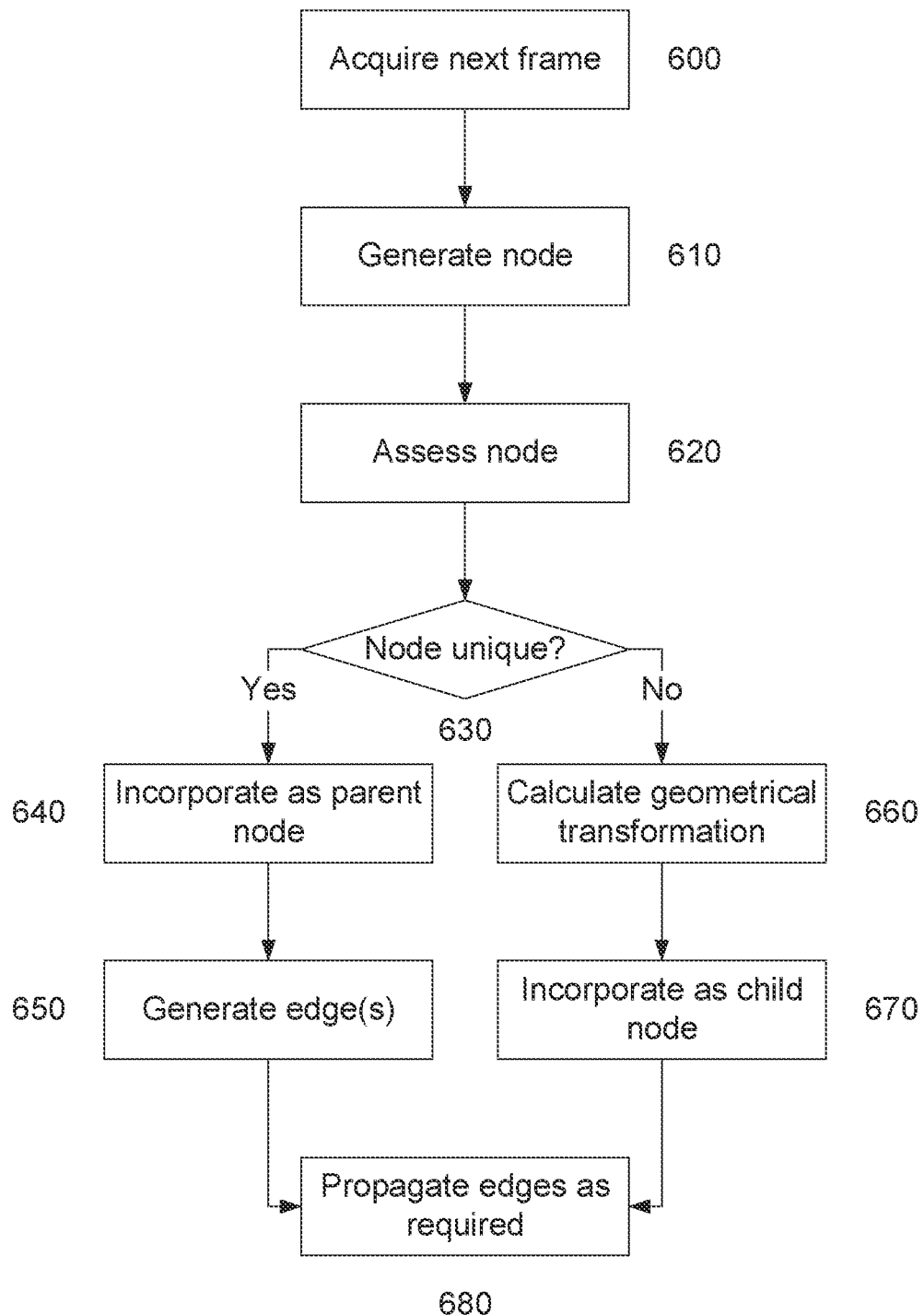
FIG. 6 is a flow chart of an example of a method for adding a node to a graph.

An example process for adding nodes to a graph will now be described with reference to FIG. 6.

In this example, at step 600 the processing device 311 acquires a next frame, with this being either a locally acquired frame generated from mapping data, or another frame received from another agent. At step 610, the processing device 311 uses the frame to generate a node, with the node being assessed at step 620 to determine a uniqueness of the frame associated with the node. The uniqueness can be established using an occupancy grid, matching process, or by assessing the trajectory to determine whether the frame is captured in a different part of the environment to a previous frame.

If the frame and hence node is assessed as unique at step 630, then at step 640 the processing device 311 incorporates the node as a parent node and then generates an edge at step 650. However, if the frame, and hence node, is assessed as not unique at step 630, then at step 660 the processing device 311 calculates a geometrical transformation between the node and a parent node, either using a trajectory traversed by the agent and/or an alignment process, and incorporates the node as a child node at step 670. Once nodes are added into the graph edges might need to be propagated from child to parent nodes at step 680.

The above-described process is performed in order to minimise the computation required in order to maintain and optimise the graph, allowing these to be performed in real time. In particular, this operates by pruning the graph so that it includes a minimal set of frames that accurately describe the environment. This pruning is not destructive to the graph and allows future retrieval of poses in pruned frames by performing rigid merging of frames into a super set containing the two frames as child and parent nodes, noting that the child or parent nodes might themselves have been previously merged. By performing this merge strategy, this ensures the graph is preserved with a simple addition of an additional edge in the graph. Once a frame has been rigidly merged it is no longer optimised, and not considered for several functions, such as loop-closure or the like, as the parent node contains the required information.

An example of the process for managing child nodes in a graph will now be described with reference to FIGS. 7A to 7D.

Figure 7A:
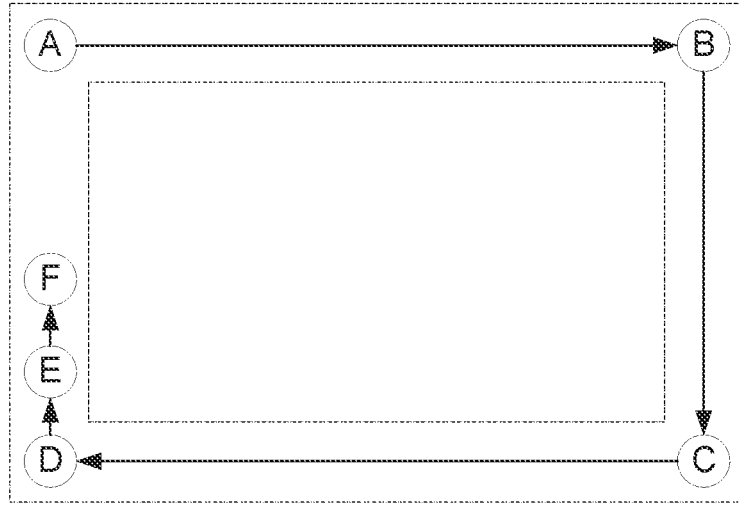
FIGS. 7A to 7D are schematic diagrams illustrating an example of the addition of child nodes to an example graph.
Figure 7B:
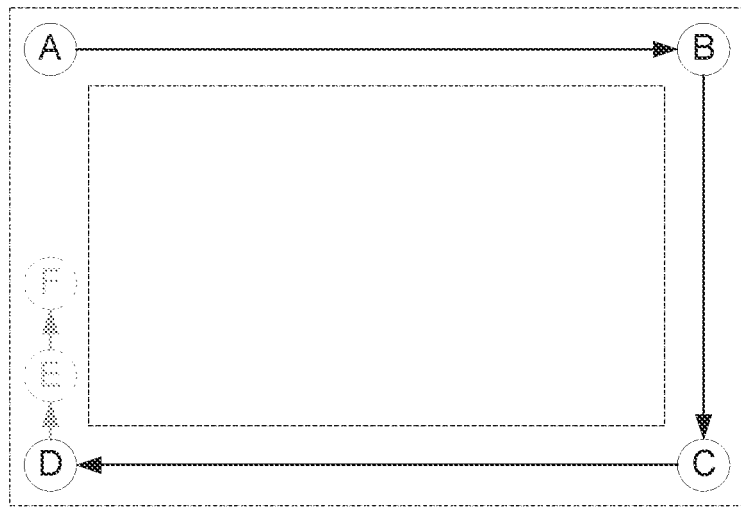

In this example, starting from the graph shown in FIG. 5A, additional nodes E and F are identified, which are closely related to node D. In this example, the nodes E and F do not contribute to the map and contain largely redundant information represented in the node D. Using simple heuristics, such as an occupancy grid for example, we can determine if the new frame is unique by checking with the last frame. In this case, the nodes E and F are not unique and can be rigidly merged into D, as shown in FIG. 7B.

The nodes E and F are no longer part of the optimization, as their position in the graph is solely dependent on the position of the parent node D, and if necessary, their global pose can be recovered using rigid transformations that relate the nodes E and F to node D.

Figure 7C:
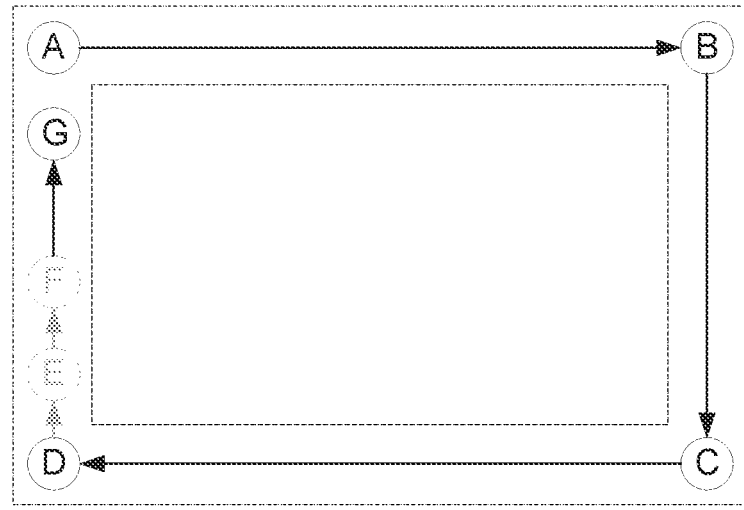

If the agent continues towards node A, eventually the heuristic used to determine if the agent is in the last frame, and hence is capturing a child node, will fail and the generation of a new frame will occur, as shown in FIG. 7C in which a new node G is added.

Figure 7D:
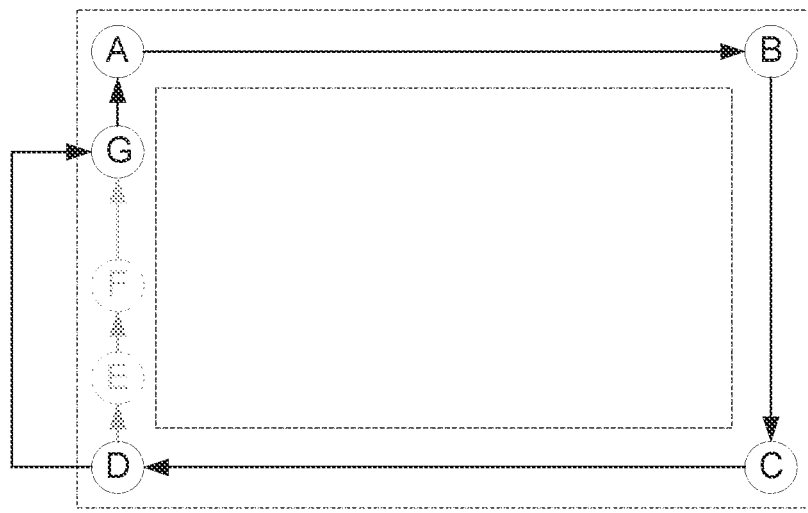

At this point in time, there exists an edge FG, which cannot be represented in the graph due to the fact that node F is not present in the optimization state. The solution to this is to propagate the edge to the parent node G by traversing the rigid transform tree to the required node. This results in a new edge DG being created as shown in FIG. 7D. This edge encapsulates the edge FG taking into account the fact that F was merged into D by creating a new edge DG and ensures the graph does not become disjoint.

After the edges have been propagated, the new node G is then tested against neighbouring nodes to look for potential loop-closures (via searching the graph) and edge traversals (via checking edges of node D). If an edge is found between nodes G and A, a new edge GA can be created, representing a return to the original starting location.

When this is done the same optimisation process described above can be performed, which involves merging and propagating edges. In this regard, at this point there exists two routes between nodes D and A, namely the loop closure edge GA and the odometry edges DE, EF, FG. A measure of confidence derived from the optimised solution can be used to determine the best edge to use, and eventually after some confidence is accrued, merging these edges is also possible, which again reduces the optimization state.

For example, having traversed the edge DA it can be detected that the agent is now back at A and from here the process continues, using neighbouring edges to look for edge-traversal which stops needless global-lookups. This process can continue to only add unique nodes to the optimization graph, which keeps the graph down to a small size for sharing and scaling with the geometric space explored.

Figure 8:
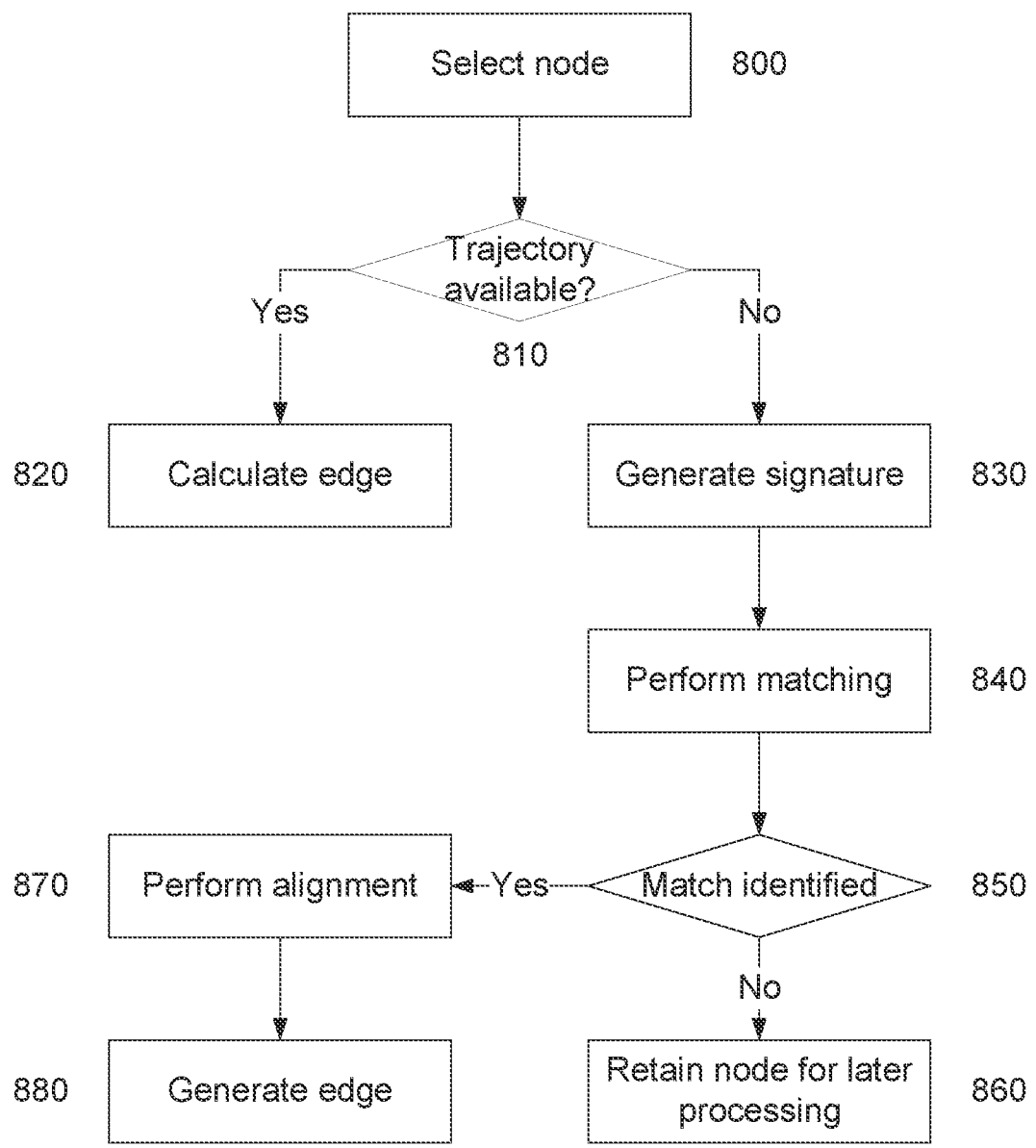
FIG. 8 is a flow chart of an example of a method of generating a graph edge.

An example of a process for edge creation will now be described in more detail with reference to FIG. 8.

In this example, at step 800 a node is selected, for example based on a next frame or received other frame, and this is assessed to determine if a trajectory exists at step 810. If a trajectory exists, then at step 820 the processing device can calculate an edge using the trajectory traversed between capture of the current node and a previous node.

In the event that a trajectory is not available, then at step 830 a signature is generated and used to perform matching at step 840 between the node and existing nodes in the graph. If a match is not identified at step 850, then the position of the node within the graph is unknown, and so the node can be retained for later processing at step 860. Otherwise, at step 870, the processing device 311 performs alignment, using an alignment process, to ascertain the relative positioning of the matching nodes, allowing an edge to be generated at step 880.

Figure 9:
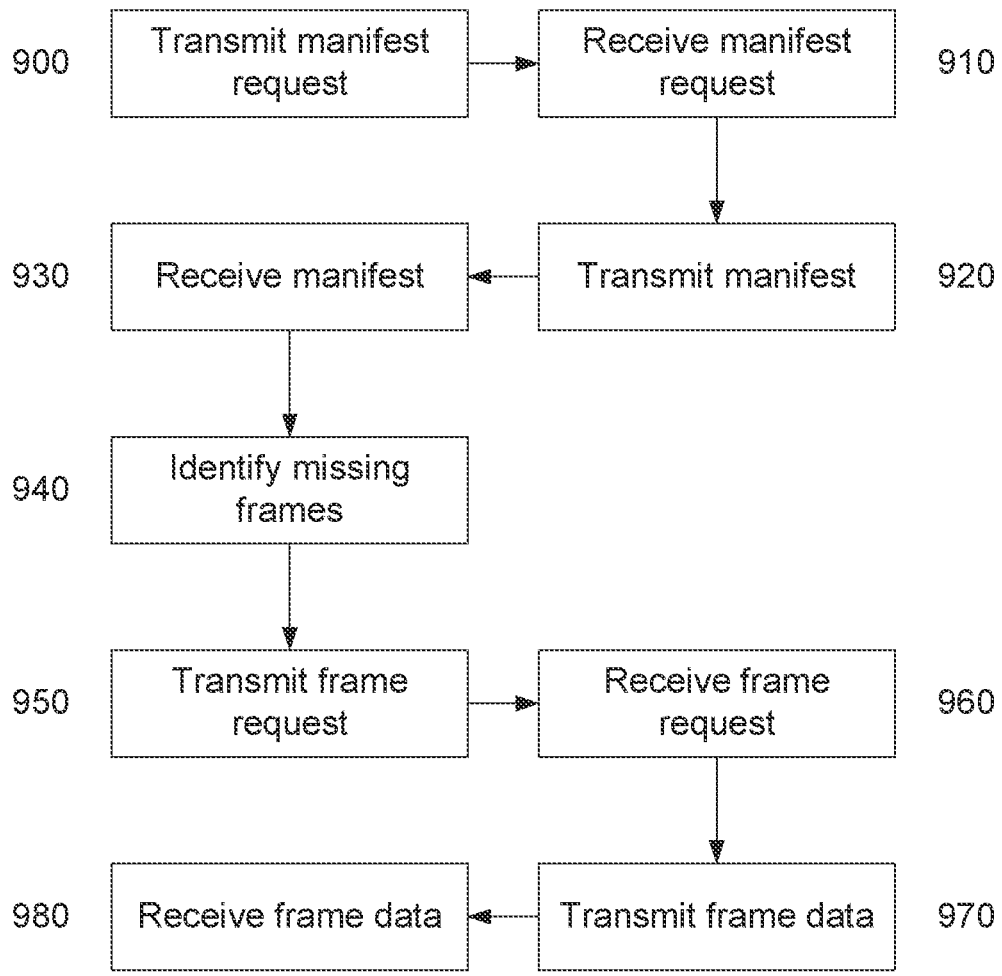
FIG. 9 is a flow chart of an example of a method of acquiring other frames from other agents.

An example of the process for acquiring other frames from other agents will now be described with reference to FIG. 9.

In this example, at step 900, the processing device 311 of a first agent generates and transmits a manifest request, requesting details of frames that other agents have available. The manifest request could be transmitted periodically, for example as a broadcast message, so that this can be processed by any other agents within communication range of the agent, or could be transmitted in response to communication being established between two agents.

At step 910, the processing device 311 of the other agent 310 receives the manifest request, and generates a list of the frames it has available, transmitting this as a manifest to the first agent at step 920. This will include frames the other agent has captured, as well as frames the other agent has received from other agents.

At step 930, the processing device 311 of the first agent receives the manifest and identifies missing frames at step 940, before transmitting a frame request for the missing frames to the agent at step 950. The processing device 311 of the other agent receives the frame request at step 960 and responds to this by transmitting frame data corresponding to the requested frames at step 970, allowing these to be received by the processing device of the first agent at step 980.

A number of specific processes performed as part of the above-described approaches will now be described.

As previously mentioned, the graph is typically pruned to a minimal node set required to represent the environment, thereby reducing the computational complexity of optimising the graph, which in turn helps ensure the performance requirements are met. This is achieved by incorporating nodes that are not sufficiently unique as child nodes, allowing optimisation to be performed using unique parent nodes only. Depending on several factors, the complexity of this operation varies drastically, with the primary factor being the level of confidence in candidate edges. This breaks down into several levels of traversal types, including intra-frame, edge, neighbours, loop-closure, and place-recognition.

The simplest form of traversal is when the agent has not moved from a current frame. This is movement within a single frame, which is most commonly observed when an agent is stationary or moving slowly with respect to its sensor's range, and is often detected using simplistic techniques such as occupancy overlap or feature overlap. The maximum error here is the local state estimation from the previous frame and as such, the confidence is very high with easy confirmation checks.

Figure 10A:
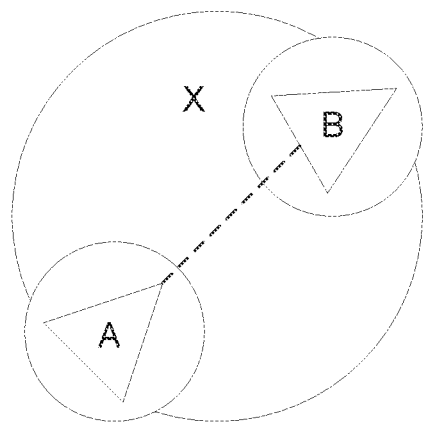
FIGS. 10A to 10C are schematic diagrams illustrating examples of approaches for determining relationships between different frames.

In the example shown in FIG. 10A, two frames A, B are identified, both of which are within the frame X. Provided the frame A was already associated with frame X, then frame B will be detected as overlapping with frame X using this technique. This allows nodes associated with frames A and B to be generated as child nodes to a parent node X.

Once an agent leaves a frame, it is possible to check existing edges on the current frame using an edge traversal, which occurs when an agent moves from the original frame into another frame having an edge to the original frame. The maximum error here is the local state estimation error after leaving the frame and as such, the confidence is fairly high and can be confirmed easily.

Figure 10B:
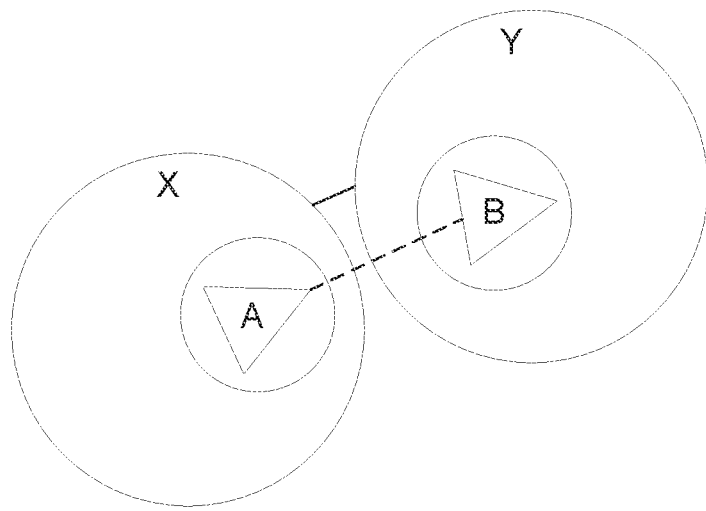

The example shown in FIG. 10B is an example of two frames A and B, which cross a previously existing edge from XY. Provided A has already been associated with X, then frame B will be detected as overlapping with frame Y using this technique.

If no edges are valid, the search can be expanded out along the graph network of nearby nodes. In this example, when mapping, an agent will often return to a previous location after a small number of frames, for example when entering and subsequently exiting a room. The amount of frames for which this is valid largely depends on a local state estimation confidence, with a higher confidence meaning a larger neighbourhood. By searching the graph for the N nearest nodes, it is possible to identify if an overlap is present and act accordingly based on the amount of confidence (number of hops). The lower the amount of hops the higher the confidence.

Figure 10C:
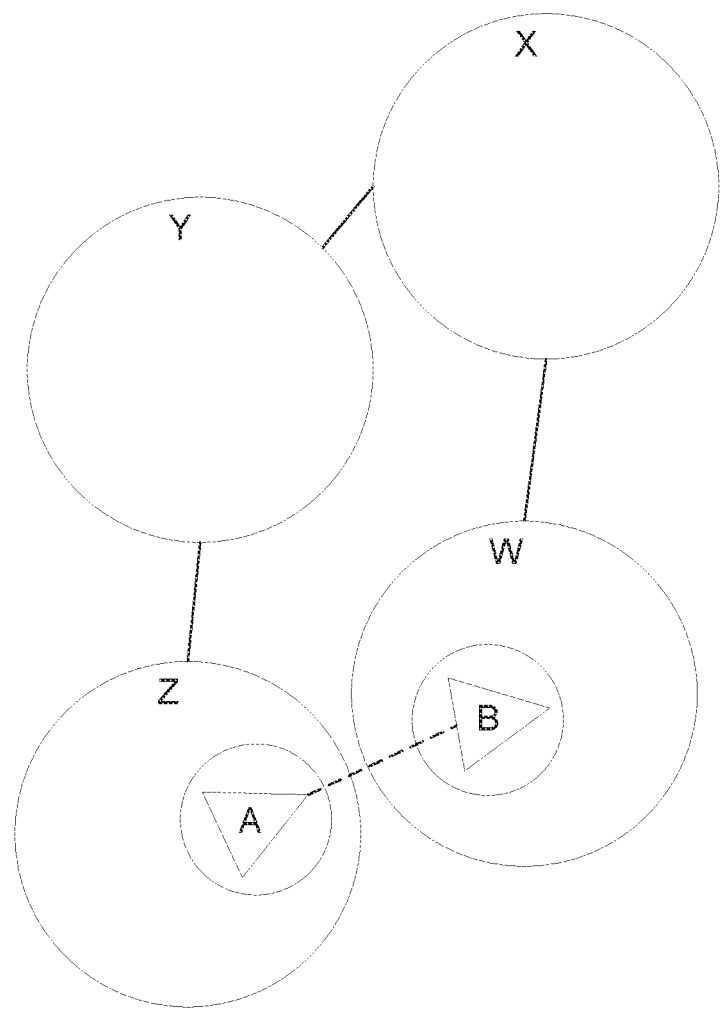

In the example of FIG. 10C, the two frames A and B are in frames Z and W respectively, however there exists no current edge WZ. The chain of nodes W, X, V, Z represents the neighbourhood of node Z and in this there exists the edge WZ, which will be detected by this technique.

Eventually performing a search of the neighbourhood can become infeasible when presented with a large enough N or when the confidence is too low, which requires more advanced techniques for detecting true edges.

Loop-closure is the process of detecting overlap between two frames in the same graph that have low confidence due to no valid global reference and large uncertainties caused by excessive edge hops, or the like. In these cases, a single candidate edge is often within the bounds of the uncertainty but may not be globally consistent, the solution used for this is to treat both sides of the edges as benchmark and build up a neighbourhood of the nearest nodes for both origins. This produces two graphs that will be accurate within themselves with respect to the origin, with dropping confidence the more edge hops from the origin. At this point, examining the edges between the two graphs will show a series of edges and associated transforms, it then becomes a matter of finding the most common edge between them. This most common edge is the most probable candidate which can then be used to validate the edges, provided some criteria is met, such as a minimum number or ratio to the next most probable.

Loop-closure at this point still has access to confidence information in the graph by traversing the edges from the candidate frames and can use this to cull many candidates early, but given an isolated graph a different approach is required.

Place-recognition is the process of detecting overlap between frames in different graphs, this means there is no association between them and therefore no measure of confidence either. The initial process for this is largely similar to the process used for loop-closure except at a much larger scale, so rather than using the neighbours, the entire graphs can be used as the two origin points. After an initial guess it can be verified by performing a pseudo merge and then using the earlier techniques to detect more overlap, if the pseudo merge yields a high confidence it two can then be merged into the same graph and the usual methods apply from then onwards.

Figure 11:
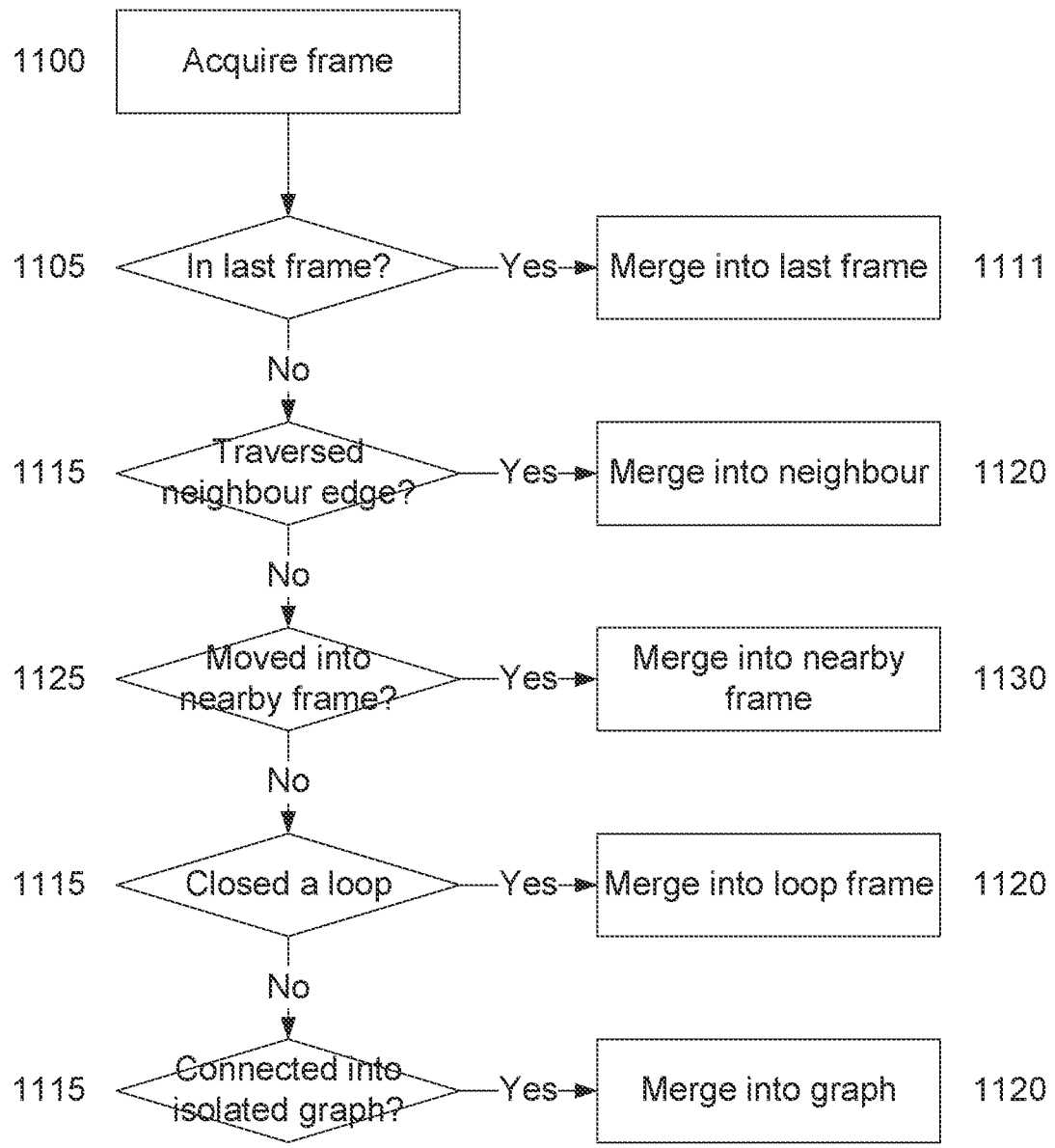
FIG. 11 is a flow chart of an example of a method for determining relationships between different frames; and, FIGS. 12A to 12C are a flow chart of a specific example of a method for mapping an environment.

A core action to perform for the graph is the addition of nodes from a locally consistent trajectory. An example of process flow for adding nodes using these approaches will now be described with reference to FIG. 11.

In this example, a frame is received at step 1100, and assessed to determine if this is within the last frame at step 1105. If so, the frame is merged into the last frame as a child node at step 1110. Otherwise, at step 1115 it is assessed to determine if a neighbour edge has been traversed and if so, the frame is merged into the neighbour frame at step 1120. Otherwise, at step 1125 it is assessed to determine if the agent has moved into a nearby frame and if so, the frame is merged into a nearby frame at step 1130. Otherwise, at step 1135 it is assessed to determine if a loop has been closed and if so, the frame is merged into a loop frame at step 1140. Otherwise, at step 1145 it is assessed to determine if an isolated graph is connected, and if so, the frame is merged into the graph at step 1150. Otherwise, the node is retained for further processing.

As the agent traverses the environment, it becomes necessary to express and convert poses between the local, global and shared map representations, which may all differ.

The local representation is an odometry estimate based on the trajectory of the agent through the environment. This is locally consistent, but tends to drift globally over time. A typical requirement for this type of recovery is that an object that has been identified in the local phase needs to be converted to the agent's global representation or the shared representation. This operation involves finding the most appropriate frame in the frame that represents that location (or potentially more for interpolation techniques) and recovering the position for the frame in the required space.

For example, given an object O captured in a frame at time half-way between frames associated with parent nodes A and B, then when the object O is first located, it is in a local estimation frame and is tied to the frame via a time and pose (in the local estimation frame). After a time, the graph will diverge from the local frame (getting global corrections etc.). Resolving the new position simply involves finding the delta applied to the frame(s) it exists in and then applying that to transform it to a new location relative to the original location.

When specifying a location in the global/shared estimation frame this can be achieved using either the local frame, or attaching it to a node in the graph.

The first case is the equivalent of saying walk west 500 paces then north 300 paces. It can only be achieved with accuracy over small distances as the local estimation will drift over time and as such requires frequent input to ensure it remains valid. Converting from the current global frame to the agent's local frame is similar to the method described above, except it only considers the most recent frames, and hence is based on where the agent currently thinks it is. This method is simple in the sense that no information is required to perform the operation other than knowing where the agent is right now in relation to the global map.

Conversely, attaching the object to a node in the graph is the equivalent of saying walk to the refrigerator in the canteen. It gives a reference to a position within a frame in the graph and means the agent must know about the requested frame. For example, if the agent hasn't been to the canteen, the agent needs to be instructed where it is in relation to the agent, either by providing the relevant portion of the graph or converting to a local representation. The agent itself can then resolve where this means globally to itself and requires a single command to reach it.

Figure 12A:
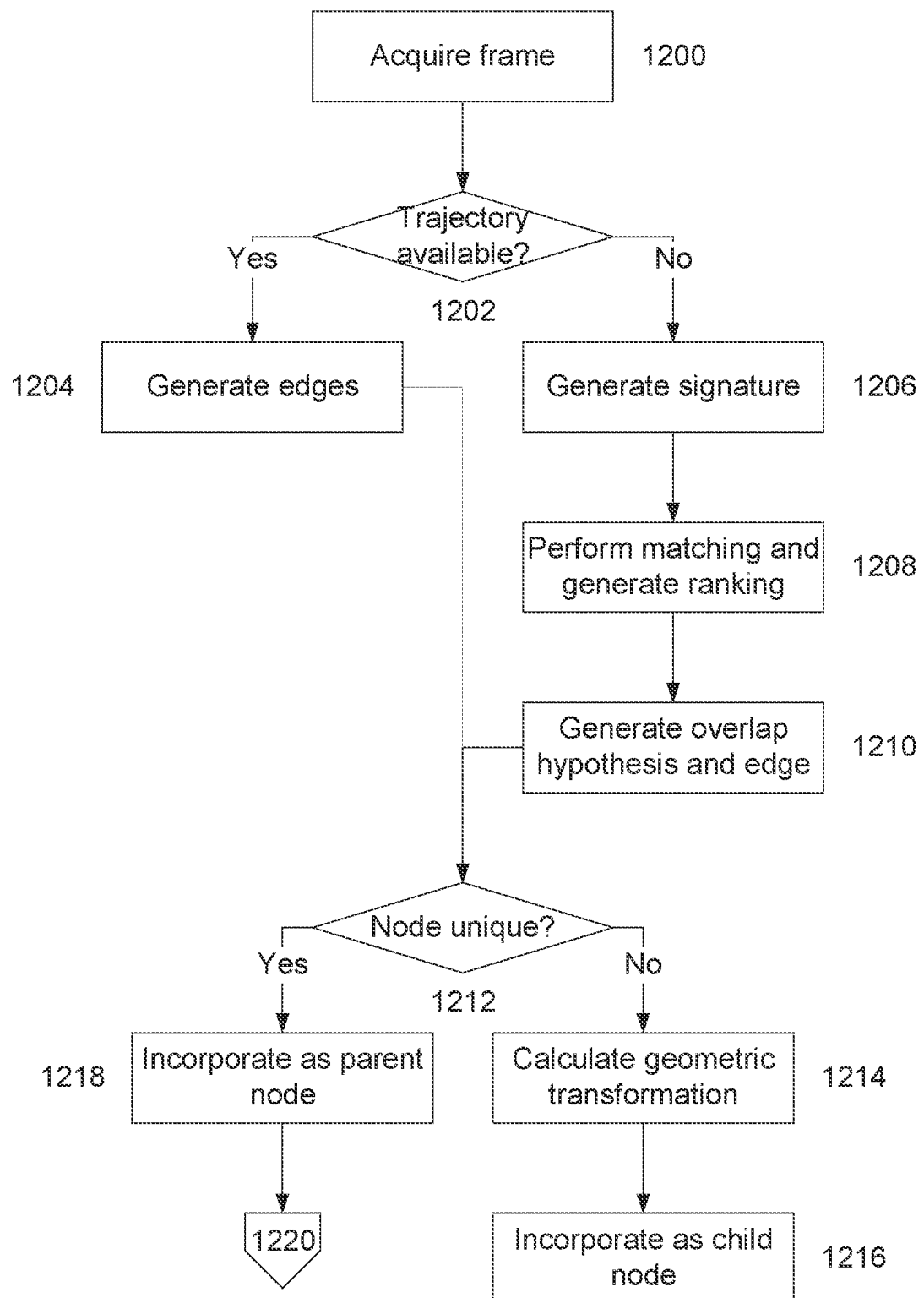
Figure 12B:
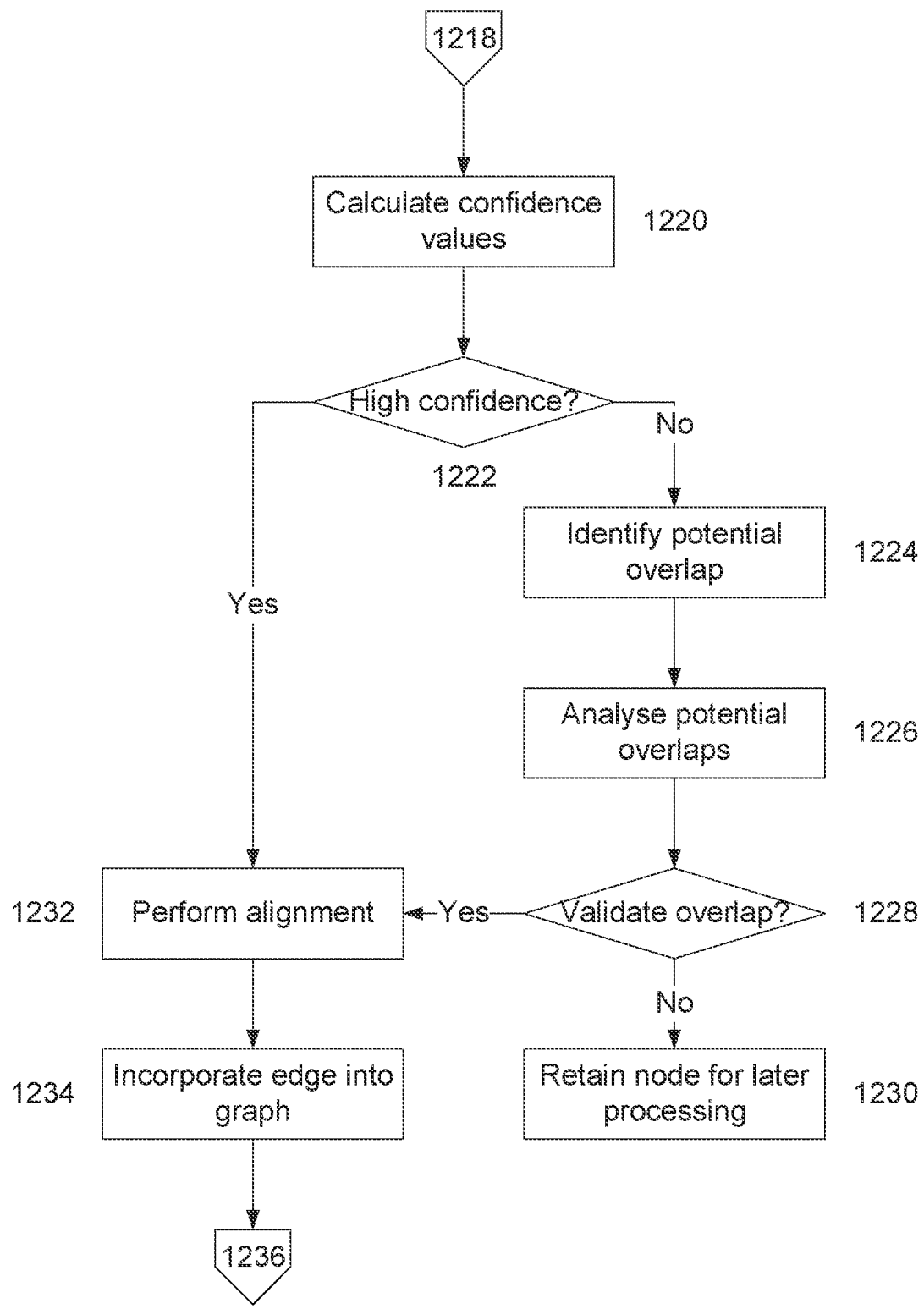
Figure 12C:
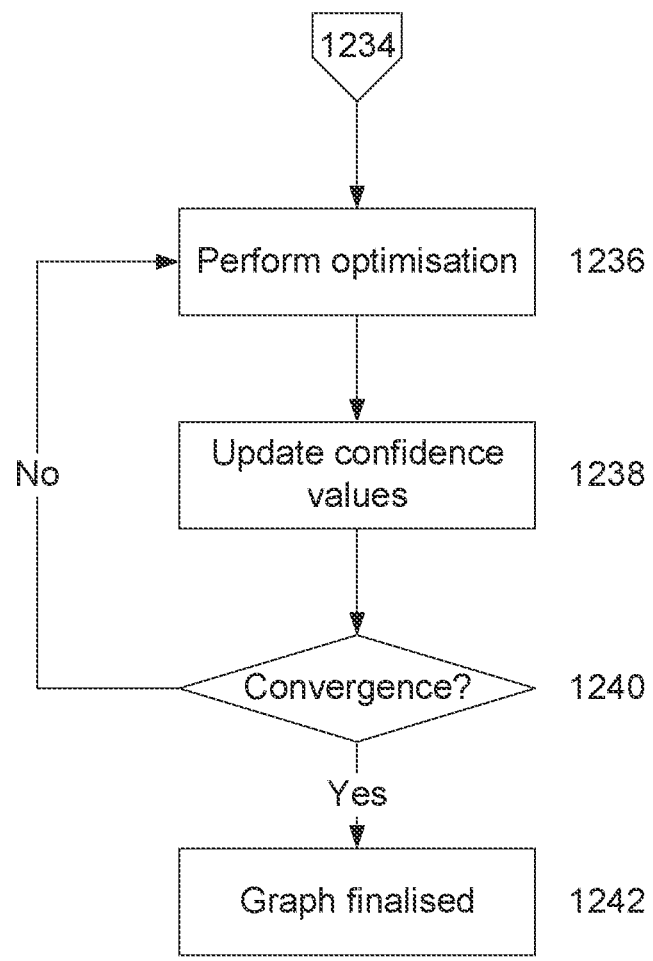

An overall process for adding frames to a graph will now be described in further detail with reference to FIGS. 12A to 12C.

In this example, a frame is acquired at step 1200, either by segmenting mapping data collected using the mapping system 312, or by receiving other frame data from one or more other agents, using this to generate a node.

At step 1202, the processing device 311 assesses whether trajectory information is available for the node, and if so, at step 1204 an edge is generated based on the trajectory.

Otherwise, at step 1206 the processing device 311 generates a signature for the frame. To perform this, the processing device generates positional and/or rotational features for the frame, such as a point descriptor or the like, from a low dimensional representation of the frame, such as a saxes or surfel representation, using this to generate an N dimensional vector. At step 1208, the processing device performs matching in an attempt to identify potentially matching frames within the graph, using this to generate a ranking.

The matching process will typically involve a search of a database of signatures of existing nodes within the graph, with the processing device 311 performing nearest-neighbour searches to return other nodes that look the same as the frame. How similar a match is and how unique a signature is determines if the match will be used, and in particular is used to generate the ranking, which takes into account a similarity between the nodes, as well as a uniqueness of the signatures. For example, matches between very unique signatures will get a higher ranking and therefore may take priority over non-unique matches (perceptual aliasing).

The ranking is used to derive an overlap hypothesis, for example to identify potential loop closures and/or place recognition at step 1210, with this step also including an alignment process to generate a candidate edge with the overlapping node.

At step 1212, using either the generated edges and/or the ranking, an assessment is made as to whether the node is unique. This typically involves assessing if the node is within an existing node and/or adds something to the map that wouldn't otherwise be present. If not, a geometric transformation between the node and an existing node is calculated at step 1214, with the new node being incorporated into the graph as a child node at step 1216, by merging the new node with the existing node. Once this has been completed, the process can return to step 1200 allowing further frames to be acquired.

Otherwise, in the event the node is sufficiently unique, it is added to the graph as a parent node at step 1218.

Following this, at step 1220, confidence values are determined for the edges within the graph. The confidence levels are calculated based on estimated errors taking into account the manner in which the edge is calculated and the fact that errors accumulate through the graph based on distances from an origin node.

Following this, new and updated parts of the graph, for example, new nodes and edges, or updates edges, are assessed at step 1222 to determine if these are in a region of high or low confidence. If the new nodes or edges are in regions of low confidence, then potential overlaps are identified and assessed at steps 1224, 1226, based for example on the hypotheses generated at step 1210. This typically involves analysing potential overlaps and identifying if there is sufficient confidence in the overlaps, or a sufficient number of overlap samples, which can be used to validate the overlaps, for example performing loop closure and/or place recognition, at step 1228. If not, the node is retained for later processing at step 1230.

Otherwise, once an overlap is generated, or in the event an edge is a high confidence part of the graph, alignment with existing nodes is performed is using positional and/or rotational invariant features at step 1232 in order to improve the accuracy of the edges, allowing these to be incorporated into the graph at step 1234.

Following this, at step 1236, the processing device 311 performs optimisation, which is achieved by solving the graph by optimizing for least squares error on the edges. The confidence values associated with the edges are updated at step 1238, with changes in the confidence values being used to ascertain if the graph has converged to an optimum solution at step 1240. If not, steps 1236 and 1238 are repeated until convergence is achieved, at which point the graph update is finalised at step 1242, allowing the graph to be used as a global map.

It will be appreciated that the above-described steps of 1200 to 1242 can be repeated as needed, allowing further nodes and edges to be added so that a global map can be progressively constructed as additional frames are captured by the agents.

Accordingly, the above-described approach provides a pose-graph optimization technique, with a strong focus on reducing the problem size and maintaining a globally consistent map at all times. At any single point in time the map contains a number frames which represent a fixed view of the world at a given point, and a series of edges which connect these via a coordinate transform, this allows traversal along the graph via these edges and transforms which remain locally consistent. On top of this each frame also has a globally consistent pose which allows for a global projection and common coordinate frame which can be used as a heuristic in path planning, as well as global space-queries.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means ±20%.

Persons skilled in the art will appreciate that numerous variations and modifications will become apparent. All such variations and modifications which become apparent to persons skilled in the art, should be considered to fall within the spirit and scope that the invention broadly appearing before described.

What is claimed is:

1. A system for generating a map of an environment, the system including:
   a plurality of agents, each agent being configured to autonomously traverse an environment and including:
   a mapping system including a range sensor, the mapping system generating mapping data indicative of a three dimensional representation of the environment as the agent traverses the environment; and,
   one or more electronic processing devices configured to control the agent autonomously traversing through the environment and generate a map as the agent traverses the environment by:
   a) acquiring the mapping data captured by a mapping system;
   b) generating frames representing parts of the environment using the mapping data;
   c) receiving other frame data from one or more other agents of the plurality of agents, the other frame data being indicative of other frames representing parts of the environment generated using other mapping data captured by a mapping system of the one or more other agents of the plurality of agents; and,
   d) generating a graph representing the map of the environment by:
      i) generating nodes using the frames and other frames, each node being indicative of a respective part of the environment; and,
      ii) calculating edges interconnecting the nodes, the edges being indicative of spatial offsets between the nodes, wherein:
         (1) each agent maintains a respective independent graph based on:
            (a) the frames generated using the mapping data captured by the agent; and
            (b) the other frames generated using the other mapping data captured by the one or more other agents of the plurality of agents; and,
         (2) the graph generated by each agent is based on locally accurate trajectories traversed by the agents and is globally consistent with graphs generated by other agents of the plurality of agents.

2. A system according to claim 1, wherein the one or more electronic processing devices are configured to:
   a) generate an initial graph using the frames; and,
   b) update the graph using additional frames and other frames by at least one of:
      i) generating additional nodes or edges; and,
      ii) refining edges within the graph.

3. A system according to claim 1, wherein the one or more electronic processing devices are configured to determine the graph at least in part using a trajectory traversed by the agent, and wherein at least one of:
   a) the one or more electronic processing devices are configured to determine the trajectory using at least one of:
      i) one or more inertial position sensors; and,
      ii) using signals from the range sensor; and,
   b) the one or more electronic processing devices are configured to calculate edges interconnecting the nodes at least in part using the trajectory.

4. A system according to claim 1, wherein the one or more electronic processing devices are configured to generate the frames at least one of:
   a) by segmenting the mapping data; and,
   b) based on at least one of:
      i) a capture time of the mapping data;
      ii) a capture duration of the mapping data;
      iii) a distance traversed during capture of the mapping data;
      iv) a rotation traversed during capture of the mapping data; and,
      v) a coverage of the mapping data.

5. A system according to claim 1, wherein the one or more electronic processing devices are configured to at least one of:
   a) segment a trajectory traversed by the agent and generate the frames using trajectory segments; and,
   b) analyze the frames and generate nodes based on results of the analysis.

6. A system according to claim 1, wherein the one or more electronic processing devices are configured to:
   a) generate a number of parent nodes, each parent node representing a different part of the environment; and,
   b) generate a number of child nodes, each child node being associated with a parent node and representing a part of the environment that is the same as or overlaps with the part of the environment represented by the associated parent node.

7. A system according to claim 6, wherein at least one of:
   a) the child nodes are related to the parent node through a fixed geometrical transformation;
   b) the one or more electronic processing devices are configured to identify child and parent nodes based on at least one of:
      i) a degree of overlap between frames associated with the nodes; and,
      ii) a degree of movement between capture of the frames associated with the nodes;
   c) the one or more electronic processing devices are configured to calculate edges extending between the parent nodes to generate the graph; and,
   d) the one or more electronic processing devices are configured to:
      i) generate edges between nodes; and,
      ii) if an edge is connected to a child node, propagate the edge to the parent node associated with the child node using a geometrical transformation between the child and parent node.

8. A system according to claim 1, wherein the one or more electronic processing devices are configured to:
   a) calculate edges between the nodes using at least one of:
      i) a localized drift approach;
      ii) loop closure;
      iii) place recognition; and
      iv) a trajectory traversed by the agent to calculate a spatial offset between nodes; and,
   b) use an iterative optimization process to refine the edges.

9. A system according to claim 1, wherein the one or more electronic processing devices are configured to calculate edges by:
   a) using an alignment process to align frames of different nodes; and,
   b) calculate the edge using the alignment.

10. A system according to claim 1, wherein the one or more electronic processing devices are configured to:
    a) use a matching process to identify potential matching nodes; and,
    b) use potential matching nodes to perform at least one of:
       i) loop closure; and,
       ii) place recognition.

11. A system according to claim 10, wherein the one or more electronic processing devices are configured to perform the matching process by:
    a) comparing a node to one or more other nodes by:
       i) calculating a signature for the node, the signature being based on one or more features of the frame associated with the node; and,
       ii) comparing the signature to other signatures of other nodes;
    b) generating a ranking based on results of the comparison, the ranking being indicative of a degree of similarity between the node and the one or more other nodes; and,
    c) use the ranking to at least one of:
       i) determine if the node represents a different part of the environment and can be designated as a parent node or child node;
       ii) generate a graph topology;
       iii) generate one or more edges;
       iv) perform loop closure; and,
       v) perform place recognition.

12. A system according to claim 10, wherein the one or more electronic processing devices are configured to:
    a) generate one or more candidate graph topologies using results of the matching process;
    b) validate at least one candidate graph topology based on overlaps between nodes associated with the graph topology; and,
    c) calculate one or more edges in accordance with the validated graph topology.

13. A system according to claim 12, wherein the one or more electronic processing devices are configured to:
    a) acquire frame data indicative of one or more new frames;
    b) generate a candidate node corresponding each new frame;
    c) calculate candidate edges using at least one of:
       i) a trajectory traversed by an agent;
       ii) an alignment process; and,
       iii) a matching process;
    d) update the graph by at least one of:
       i) adding one or more nodes based on the candidate nodes; and,
       ii) adding or updating one or more edges based on the candidate edges.

14. A system according to claim 13, wherein the one or more electronic processing devices are configured to:
    a) identify changes in the graph including at least one of:
       i) added nodes;
       ii) added edges; and,
       iii) updated edges;
    b) evaluate changes in the graph; and,
    c) selectively update the graph based on results of the evaluation by:
       i) calculating a confidence value associated with at least some parts of the graph; and,
       ii) selectively updating the graph based on the confidence values.

15. A system according to claim 14, wherein if a node is a new node or is proximate a new edge, the one or more electronic processing devices are configured to:
    a) assess confidence values associated with nearby nodes and edges; and,
    b) if the confidence value exceeds a threshold:
       i) perform alignment matching with nearby nodes and edges; and,
       ii) generate new edges based on results of the alignment matching; and,
    c) if the confidence value falls below a threshold perform matching to identify potential matching nodes.

16. A system according to claim 15, wherein the one or more electronic processing devices are configured to:
    a) calculate estimated errors associated with edges in the graph; and,
    b) at least one of:
       i) generate confidence values based on the estimated errors; and,
       ii) optimize the graph at least in part using the estimated errors by:

(1) identifying edges with a high estimated error; and,
(2) validating the identified edges using graph prediction.

17. A system according to claim 1, wherein the one or more electronic processing devices are configured to iteratively solve the graph using an optimization approach until the graph converges to a result by:
   a) solving the graph based on edge constraints optimizing for least squares error on the edges;
   b) updating errors associated with the edges; and,
   c) repeating the solving and updating steps until the graph converges.

18. A system according to claim 1, wherein the one or more electronic processing devices are configured to:
   a) obtain a frame manifest from the one or more other agents of the plurality of agents, the frame manifest being indicative of frames available to the one or more other agents of the plurality of agents; and,
   b) request frames from the one or more other agents of the plurality of agents in accordance with the frame manifest.

19. The system of claim 1, wherein the one or more electronic processing devices of a particular agent are configured to control navigation of the particular agent through the environment using the particular agent's map.

20. The system of claim 1, wherein the agents are autonomous vehicles.

21. A system for generating a map of an environment, the system including:
   a plurality of vehicles, each vehicle being configured to autonomously traverse an environment and including:
   a mapping system including a range sensor, the mapping system generating mapping data indicative of a three dimensional repreentation of the environment as the vehicle traverses the environment; and,
   one or more electronic processing devices configured to:
      a) acquire the mapping data captured by the mapping system;
      b) generate frames representing parts of the environment using the mapping data;
      c) receive other frame data from one or more other vehicles of the plurality of vehicles, the other frame data being indicative of other frames representing parts of the environment generated using other mapping data captured by a mapping system of the one or more other vehicles of the plurality of vehicles;
      d) generate a graph representing a map of the environment by:
         i) generating nodes using the frames and other frames, each node being indicative of a respective part of the environment; and,
         ii) calculating edges interconnecting the nodes, the edges being indicative of spatial offsets between the nodes, wherein:
            (1) each vehicle maintains a respective independent graph based on:
               (a) the frames generated using the mapping data captured by the vehicle; and
               (b) the other frames generated using the other mapping data captured by the one or more other vehicles of the plurality of vehicles; and,
            (2) the graph generated by each vehicle is based on locally accurate tragectories traversed by the vehicles and is globally consistent with graphs generated by other vehicles of the plurality of vehicles; and,
      e) control navigation of the autonomous vehicles through the environment using the map.

* * * * *